(12) United States Patent
Kamijima

(10) Patent No.: US 7,113,333 B2
(45) Date of Patent: Sep. 26, 2006

(54) SCREEN HAVING MICRO-LENS ARRAY AND PROJECTOR

(75) Inventor: Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 154 days.

(21) Appl. No.: 10/921,866

(22) Filed: Aug. 20, 2004

(65) Prior Publication Data

US 2005/0078367 A1    Apr. 14, 2005

(30) Foreign Application Priority Data

Aug. 27, 2003   (JP)   ............................. 2003-302953

(51) Int. Cl.
  *G03B 21/60* (2006.01)
  *G02B 3/08* (2006.01)
  *G02F 1/135* (2006.01)
  *G02F 1/1335* (2006.01)
  *H01S 3/10* (2006.01)
  *H04N 9/04* (2006.01)

(52) U.S. Cl. .................... 359/456; 359/457; 359/449; 359/453; 359/460; 359/742; 349/30; 349/25; 349/95; 372/24; 348/210.99

(58) Field of Classification Search ........ 359/456–457, 359/443, 449, 453, 460, 742, 27; 349/30, 349/25, 95; 372/24; 348/210.99
See application file for complete search history.

(56) References Cited

U.S. PATENT DOCUMENTS

| | | | |
|---|---|---|---|
| 6,816,306 B1 * | 11/2004 | Freese et al. | 359/456 |
| 6,829,087 B1 * | 12/2004 | Freese et al. | 359/455 |
| 2003/0206342 A1 * | 11/2003 | Reed et al. | 359/460 |

FOREIGN PATENT DOCUMENTS

JP     A 2003-029344     1/2003

* cited by examiner

*Primary Examiner*—W. B. Perkey
*Assistant Examiner*—Magda Cruz
(74) *Attorney, Agent, or Firm*—Oliff & Berridge, PLC

(57) ABSTRACT

Aspects of the invention provide a screen or the like that enables a bright, homogeneous projection image to be observed in a wide range across an area where viewers are present. A screen having a micro-lens array formed of a plurality of micro-lens elements each having a first surface having a curvature and a second surface of an almost planar shape through which incident light that comes incident on the first surface can be transmitted.

9 Claims, 18 Drawing Sheets

SCREEN HAVING MICRO-LENS ARRAY AND PROJECTOR

BACKGROUND OF THE INVENTION

1. Field of Invention

Aspects of the invention can relate to a screen and a projector, and more particularly to techniques for a screen using a micro-lens array.

2. Description of Related Art

Related art micro-lens arrays can be used in a screen to form a projection image through transmission or reflection of projection light from a projector. The related art micro-lens array can include a plurality of micro-lens elements. Each micro-lens element forming the micro-lens array allows projection light to travel in a direction to the viewers by refracting the projection light in a predetermined direction. Hence, by providing the micro-lens array to the screen, it is possible to secure a satisfactory field of view by improving light utilization. A technique, for example, in JP-A-2003-29344 is a technique for a screen using the micro-lens array.

SUMMARY OF THE INVENTION

In the related micro-lens array used in the screen, however, the light-scattering angle of the micro-lens elements in the peripheral portion of the screen is larger than the light-scattering angle of the micro-lens elements in the central portion of the screen. When the light-scattering angle of the micro-lens elements in the peripheral portion of the screen is large, projection light transmitted or reflected in the peripheral portion of the screen scatters in a wider range. This can raise a problem that a projection image of a satisfactory light quantity can be obtained at the central position of the screen, whereas the projection image becomes darker at the peripheral position of the screen. An aspect of the invention can to provide a screen and a projector that enable a bright, homogeneous projection image to be observed in a wide range across the area where the viewers are present.

According to the invention, it can be possible to provide a screen having a micro-lens array provided to an incident side of incident light and formed of a plurality of micro-lens elements each having a first surface having a curvature and a second surface of an almost planar shape through which incident light that comes incident on the first surface is transmitted. The screen is characterized in that the plurality of micro-lens elements are aligned on a reference plane having a specific region, and let an almost central position of a region of the second surface of each micro-lens element be a reference central position, and when a plane that comes in contact with the first surface of the micro-lens element and the reference plane are almost parallel to each other, let a position of a contact point of the plane that comes in contact with the first surface and the first surface, projected on the reference plane, be an apical curvature position, then the first surface has the curvature by which the reference central position and the apical curvature position are varied by a predetermined distance in a predetermined direction, according to the reference central position of the micro-lens element on the reference plane.

For the micro-lens array in the screen of the invention, the micro-lens elements can be of a shape decentered according to the positions of the micro-lens elements on the reference plane of the screen. The positions of the micro-lens elements on the reference plane referred to herein mean the reference central positions of the micro-lens elements.

Each micro-lens element can include the first surface having the curvature by which the reference central position and the apical curvature position are varied by a predetermined distance in a predetermined direction. For example, a micro-lens element, having the first surface of a rotationally symmetrical shape with respect to the normal line passing the reference central position, is placed at the optical axis position of the projection lens. By providing the micro-lens element having the rotationally symmetrical first surface, incident light on the micro-lens element is refracted on the first surface to travel in a direction to the optical axis of the projection lens. Hence, light in the vicinity of the optical axis position of the projection lens scatters in a range having the optical axis of the projection lens at the center.

Also, in the peripheral portion of the screen can be provided the micro-lens elements having the first surfaces whose apical curvature positions are shifted from the reference central positions in a direction to the optical axis position of the projection lens. By shifting the apical curvature position from the reference central position in a direction to the optical axis position of the projection lens, the first surfaces of the micro-lens elements have a shape inflected in a direction to the optical axis of the projection lens. By providing the micro-lens elements of a shape decentered as described above, incident light on the micro-lens elements is refracted on the first surfaces to travel toward the optical axis of the projection lens. Light in the vicinity of the peripheral portion of the screen thus scatters in a range tilted in a direction to the optical axis of the projection lens. It is thus possible to concentrate projection light in a desired range. Because projection light is concentrated in a desired range, a bright projection image can be obtained even in the peripheral portion of the screen.

Also, it is possible to reduces or suppress a reduction in light utilization by preventing light in the vicinity of the peripheral portion of the screen from scattering in a direction away from the direction to the optical axis of the projection lens. Outgoing light from the respective positions on the screen scatters in a range where projection light is concentrated. It is thus possible to observe outgoing light from all the positions in an adequate quantity of light, which can in turn make the projection image homogeneous. It is thus possible to obtain a screen that enables a bright, homogeneous projection image to be observed in a wide range across the area where the viewers are present.

Also, according to a preferred aspect of the invention, it is preferable that a distance between the reference central position of the micro-lens element and a predetermined position on the reference plane, and the predetermined distance between the reference central position of the micro-lens element and the apical curvature position of the micro-lens element are almost proportional. For example, assume that the predetermined position on the reference plane of the screen is the optical axis position of the projection lens. In this instance, the micro-lens element has an apical curvature position, with which the distance between the reference central position and the optical axis position of the projection lens and the distance between the reference central position and the apical curvature position are almost proportional. Hence, as the distance from the optical axis position of the projection lens increases, the first surface of the micro-lens element has a shape that is inflected more significantly. In addition, the first surface of the micro-lens element in the vicinity of the optical axis position of the projection lens has a shape close to a rotationally symmetrical shape with respect to the normal line passing the reference central position. By providing the micro-lens elements of the shapes as described above, it is possible to concentrate projection light in a desired range precisely. It is thus possible to obtain a screen that enables a bright, homogeneous projection image to be observed in a wide range across the area where the viewers are present.

Also, according to a preferred aspect of the invention, it is preferable that an orientation of the predetermined position on the reference plane with respect to the reference central position of the micro-lens element, and an orientation of the apical curvature position of the micro-lens element with respect to the reference central position of the micro-lens element are almost identical. Given the optical axis position of the projection lens as the predetermined position on the reference plane of the screen, then the apical curvature position of the micro-lens element is positioned, with respect to the reference central position, in an orientation same as the orientation of the optical axis of the projection lens with respect to the position of the micro-lens element. Hence, the first surfaces of the micro-lens elements in the peripheral portion of the screen are of a shape that is inflected to be decentered in a direction to the optical axis of the projection lens. By providing the micro-lens elements of the shape as described above, it is possible to concentrate projection light in a desired range precisely. It is thus possible to obtain a screen that enables a bright, homogeneous projection image to be observed in a wide range across the area where the viewers are present.

Also, as a preferred aspect of the invention, it is preferable that each of the micro-lens elements refracts and then emits the incident light so as to irradiate a specific area with an almost homogeneous distribution of light intensity. By causing the micro-lens elements forming the micro-lens array to be decentered as described above, it is possible to refract incident light to irradiate a specific area with an almost homogeneous distribution of light intensity.

Incident light is thus allowed to travel so as to irradiate an area where the observers are present with an almost homogeneous distribution of light intensity. It is thus possible to obtain a screen that enables a bright, homogeneous projection image to be displayed in a wide range across the area where the viewers are present.

Also, as a preferred aspect of the invention, it is preferable that the screen further includes a Fresnel lens that converts the incident light to almost parallel beams of light to be emitted toward the micro-lens array, and the micro-lens elements refract and then emit the almost parallel beams of light from the Fresnel lens. The Fresnel lens is furnished with a function of deflecting incident light through diffraction. By providing the Fresnel lens on the incident side of the micro-lens array, it is possible to supply the respective micro-lens elements with incident light in the form of almost parallel beams of light. The respective micro-lens elements are thus able to refract and then emit almost parallel beams of light so as to irradiate an area where the viewers are present with an almost homogeneous distribution of light intensity. Because the Fresnel lens converts incident light to almost parallel beams of light, providing the Fresnel lens makes it easier to design the respective micro-lens elements to deflect incident light to a desired direction. The screen, therefore, can be designed easily.

Also, as a preferred aspect of the invention, it is preferable that the micro-lens elements refract and then emit the incident light, which is scattered light or converged light. By making the respective micro-lens elements in a decentered shape, it is possible to refract and then emit scattered light or converged light from the projection lens, which has not been converted to parallel beams of light, so as to irradiate an area where the viewers are present with an almost homogenous distribution of light intensity.

When the micro-lens elements are able to refract and then emit incident light so as to directly irradiate an area where the viewers are present almost homogeneously, the need for the Fresnel lens to convert incident light to almost parallel beams of light is eliminated. The Fresnel lens does not diffract incident light to a desired direction unless the incident angle is the pre-set angle. Also, diffracted light of unwanted orders is generated due to the diffraction function. Hence, when the Fresnel lens is used, there is a loss in quantity of light. In other words, when the need for the Fresnel lens is eliminated, there is no loss in quantity of light caused by the Fresnel lens, which can in turn improve light utilization. In addition, when the need for the Fresnel lens is eliminated, the number of components is reduced, and the screen can be of an inexpensive, simple configuration. It is thus possible to obtain a screen of an inexpensive, simple configuration, capable of improving light utilization.

Also, as a preferred aspect of the invention, it is preferable that the screen further includes a reflection surface to reflect the incident light that has been refracted on the first surface and transmitted through the second surface, and that the reflection surface reflects the incident light in a direction to the first surface and the first surface refracts and then emits the incident light from the reflection surface. By reflecting incident light on the reflection surface followed by refraction on the first surface, incident light on the screen is allowed to travel to nearly the entire region across the specific area where the viewers are present. It is thus possible to obtain a reflective screen that enables a bright, homogeneous projection image to be observed in a wide range across the area where the viewers are present.

Further, according to the invention, it is possible to provide a projector, characterized by including a case provided with a screen on a predetermined surface. Inside the case can be housed a light source portion to supply light containing first color light, second color light, and third color light, a color separation optical system to separate light supplied from the light source portion to the first color light, the second color light, and the third color light, a first color light spatial light modulation device to modulate the first color light according to an image signal, a second color light spatial light modulation device to modulate the second color light according to an image signal, a third color light spatial light modulation device to modulate the third color light according to an image signal, a color synthesis optical system to synthesize the first color light, the second color light, and the third color light modulated in the first color light spatial light modulation device, the second color light spatial light modulation device, and the third color light spatial light modulation device, respectively, and a projection optical system to project light synthesized in the color synthesis optical system; and the screen can also be the screen described above. A so-called rear type projector displays a projection image by transmission of light from the projection optical system through the screen. By using the screen described above as the screen for the rear type projector, it is possible to allow projection light from the projection optical system to travel to nearly the entire region across the specific area where the viewers are present. It is thus possible to obtain a rear type projector that enables a bright, homogeneous projection image to be observed in a wide range across the area where the viewers are present.

Also, as a preferred aspect of the invention, it is preferable to include a laser light generating portion to modulate and then emit laser light of respective colors, including first color laser light, second color laser light, and third color laser light, independently according to an image signal, a light scanning portion, having a reflection surface to reflect the laser light of respective colors from the laser light generating portion, to scan the laser light of respective colors in a 2-D direction by rotating the reflection surface about predetermined two axes intersecting at right angles with each other, and a screen to display a projection image by the laser light of respective colors scanned by the light scanning portion, wherein the screen is the screen described above. A so-called laser projector displays a projection image by transmission of a beam of laser light modulated according to an image signal through the screen. By using the screen described above as the screen for the laser projector, it is possible to allow laser light from the laser light generating portion to travel to nearly the entire region across the specific area where the viewers are present. It is thus possible to obtain a laser projector that enables a bright, homogeneous projection image to be observed in a wide range across the area where the viewers are present.

BRIEF DESCRIPTION OF THE DRAWINGS

The invention will be described with reference to the accompanying drawings, wherein like numerals reference like elements, and wherein:

FIG. 4-1 is a cross section of a micro-lens element;

FIG. 4-2 is a cross section of a micro-lens element;

FIG. 4-3 is a cross section of a micro-lens element;

FIG. 4—4 is a cross section of a micro-lens element;

FIG. 4-5 is a cross section of a micro-lens element;

FIG. 5 is an explanatory view of deflection of incident light by a conventional screen;

FIG. 7-1 is an explanatory view of deflection of incident light by a micro-lens element;

FIG. 7-2 is an explanatory view of deflection of incident light by a micro-lens element;

FIG. 7-3 is an explanatory view of deflection of incident light by a micro-lens element;

FIG. 9-1 is an explanatory view of a second manufacturing method of the micro-lens array;

FIG. 9-2 is an explanatory view of the second manufacturing method of the micro-lens array;

FIG. 10-1 is a cross section of a micro-lens array;

FIG. 10-2 is a plan view of the micro-lens array;

DETAILED DESCRIPTION OF PREFERRED EMBODIMENTS

Exemplary Embodiments of a projector of the invention will now be described in detail with reference to the accompanying drawings. It should be appreciated, however, that the invention is not limited to the exemplary embodiments described below.

Figure 1:
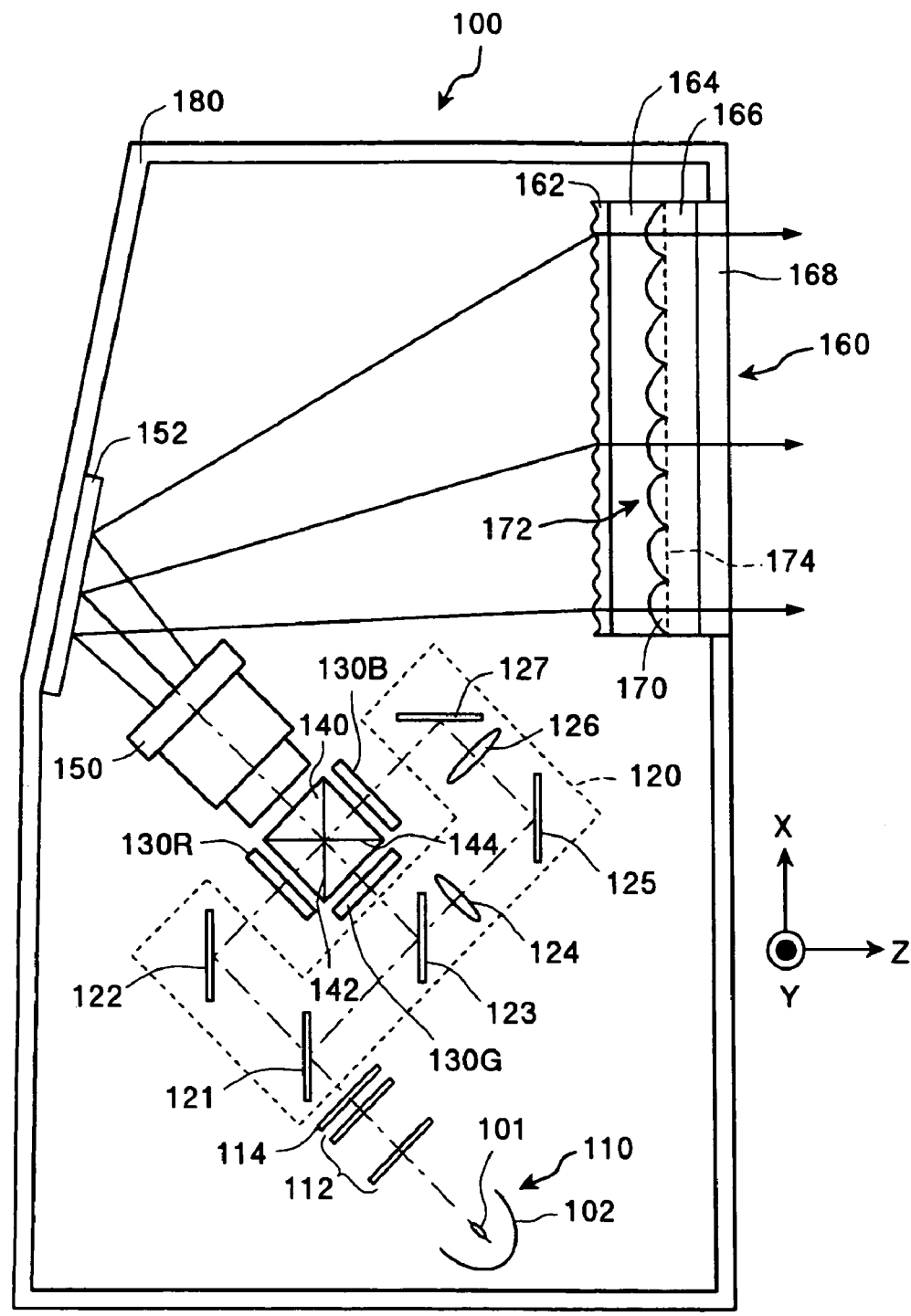
FIG. 1 is a view schematically showing the configuration of a projector according to a first exemplary embodiment of the invention.

FIG. 1 schematically shows the configuration of a projector 100 according to a first exemplary embodiment of the invention. The projector 100 is a so-called rear type projector that displays an image by transmission of projection light through a screen 160 provided to a case 180. The case 180 of the projector 100 is provided with the screen 160 on a predetermined surface on the viewers' side. A light source portion 110 can include a light emitting portion 101 to supply light and a reflector 102. An ultra-high pressure mercury lamp can be used as the light emitting portion 101. The light emitting portion 101 supplies R light as first color light, G light as second color light, and B light as third color light. Light from the light emitting portion 101 is emitted directly or through reflection on the reflector 102. Light from the light source portion 110 is converted to beams of light almost parallel to the main beam in a lighting optical system (not shown), after which the light goes incident on a fly's-eye integrator 112. The fly's-eye integrator 112 is to achieve a homogeneous distribution of illumination intensity of light from the light source portion 110.

Light, whose distribution of illumination intensity has been made homogeneous by the fly's-eye integrator 112, is converted to polarized light having a specific oscillation direction, for example, S-polarized light, in a polarization converting element 114. Light converted to the S-polarized light goes incident on an R light transmitting dichroic mirror 121 forming a color separation optical system 120. The color separation optical system 120 separates light supplied from the light source portion 110 to the R light, the G light, and the B light. The R light will be described in greater detail below. The R light transmitting dichroic mirror 121 transmits the R light, and reflects the G light and the B light. The R light having passed through the R light transmitting dichroic mirror 121 goes incident on a reflection mirror 122. The reflection mirror 122 bends the light path of the R light by 90 degrees. The R light, the light path of which has been bent, goes incident on an R light liquid crystal display device 130R serving as a first color light spatial light modulation device. The R light liquid crystal display device 130R is a transmissive liquid crystal display device that modulates the R light according to an image signal. Because the polarization direction of light remains unchanged after the light has passed through a dichroic mirror, the R light that comes incident on the R light liquid crystal display device 130R remains as the S-polarized light. The S-polarized light that comes incident on the R light liquid crystal display device 130R is converted to P-polarized light, which is then converted to S-polarized light through modulation according to an image signal. The R light, which is now converted to the S-polarized light through modulation, goes incident on a cross dichroic prism 140 serving as a color synthesis optical system.

The G light will now be described. The light paths of the G light and the B light, reflected on the R light transmitting dichroic mirror 121, are bent by 90 degrees. The G light and the B light, whose light paths have been bent, go incident on a B light transmitting dichroic mirror 123 forming the color separation optical system 120. The B light transmitting dichroic mirror 123 reflects the G light and transmits the B light. The G light reflected on the B light transmitting dichroic mirror 123 goes incident on a G light liquid crystal display device 130G serving as a second color light spatial light modulation device. The G light liquid crystal display device 130G is a transmissive liquid crystal display device that modulates the G light according to an image signal. The G light to go incident on the G light liquid crystal display device 130G has been converted to S-polarized light. The S-polarized light that comes incident on the G light liquid crystal display device 130G is converted to P-polarized light through modulation according to an image signal. The G light, which is now converted to the P-polarized light through modulation, goes incident on the cross dichroic prism 140 serving as the color synthesis optical system.

The B light will now be described. The B light having passed through the B light transmitting dichroic mirror 123 passes through a relay lens 124, after which the light path thereof is bent by 90 degrees by a reflection mirror 125. The B light further passes through a relay lens 126, and the light path thereof is bent by 90 degrees by a reflection mirror 127, after which the B light goes incident on a B light liquid crystal display device 130B serving as a third color light spatial light modulation device. The B light liquid crystal display device 130B is a transmissive liquid crystal display device that modulates the B light according to an image signal. The reason why the B light having passed through the B light transmitting dichroic mirror 123 is directed to pass through the two relay lenses 124 and 126 is that the light path of the B light is longer than the light paths of the R light and the G light. By using the two relay lenses 124 and 126, it is possible to guide the B light having passed through the B light transmitting dichroic mirror 123 directly to the B light liquid crystal display device 130B. The B light to go incident on the B light liquid crystal display device 130B has been converted to S-polarized light. The S-polarized light that comes incident on the B light liquid crystal display device 130B is converted to P-polarized light, which is then converted to S-polarized light through modulation according to an image signal. The B light modulated in the B light liquid crystal display device 130B goes incident on the cross dichroic prism 140 serving as the color synthesis optical system.

The crossed dichroic prism 140 serving as the color synthesis optical system can include two dichroic films 142 and 144 placed to intersect at right angles in the shape of a letter X. The dichroic film 142 reflects the R light and transmits the B light and the G light. The dichroic film 144 reflects the B light and transmits the R light and the G light. In this manner, the cross dichroic prism 140 synthesizes the R light, the G light, and the B light that have been modulated in the R light liquid crystal display device 130R, the G light liquid crystal display device 130G, and the B light liquid crystal display device 130B, respectively. As has been described, it is set in such a manner that light that comes incident on the cross dichroic prism 140 from the R light liquid crystal display device 130R and the B light liquid crystal display device 130B is S-polarized light. Also, it is set in such a manner that light that comes incident on the cross dichroic prism 140 from the G light liquid crystal display device 130G is P-polarized light. The polarization directions of light to go incident on the cross dichroic prism 140 are differed in this manner for the light coming out from the liquid crystal display devices of the respective colors to be synthesized effectively in the cross dichroic prism 140. The dichroic films 142 and 144 are normally excellent in the reflection characteristic for S-polarized light. For this reason, the R light and the B light to be reflected on the dichroic films 142 and 144 are S-polarized light, and the G light to pass through the dichroic films 142 and 144 is P-polarized light. A projection lens 150 projects light synthesized in the cross dichroic prism 140 in a direction to the reflection mirror 152. The reflection mirror 152 reflects the projection light from the projection lens 150 in a direction to the screen 160. The screen 160 displays a projection image by transmitting projection light reflected on the reflection mirror 152.

The configuration of the screen 160 will now be described. The screen 160 is a transmissive screen, one surface of which is used to project modulated light and the other surface of which is used to view a projection image. The screen 160 includes a micro-lens array 172 comprising a plurality of micro-lens elements 170.

The micro-lens array 172 is formed by filling a plurality of concave portions in a substrate 164 with an optically transparent resin layer 166. The micro-lens elements 170 are aligned on a reference plane 174 almost parallel to the X-Y plane. The reference plane 174 is a plane included in the optically transparent resin layer 166, and defined by the plurality of concave portions in the substrate 164. The substrate 164 can be made of an optically transparent member, such as a glass member and a transparent resin member. On the light incident side of the substrate 164 is provided a Fresnel lens 162. The Fresnel lens 162 converts incident light from the reflection mirror 152 to scattered light having a main axis in a direction almost perpendicular to the screen 160, through the diffraction function. Also, the substrate 164 is bonded to a scattering layer 168 via the optically transparent resin layer 166.

Figure 2:
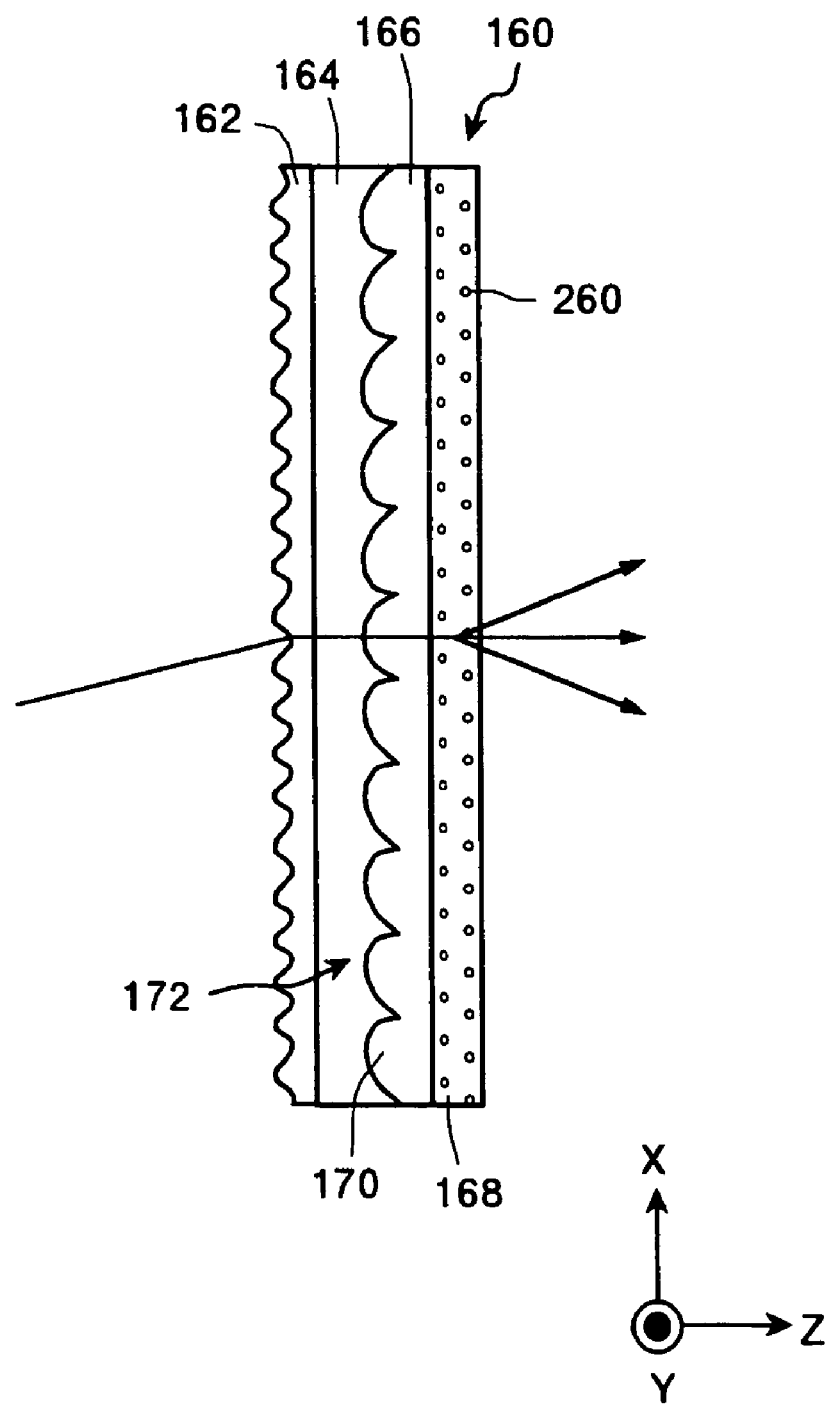
FIG. 2 is an explanatory view of a scattering layer.

As is shown in FIG. 2, the scattering layer 168 includes a number of scattering material pieces 260. The scattering material pieces 260 can be spherical or crushed chips made of resin. The scattering material pieces 260, by having a refractive index different from that of the peripheral portion, scatter light that comes incident on the scattering material pieces 260. It is thus possible to prevent the occurrence of irregularities in illumination intensity, or so-called scintillation, in a projection image. There may be a loss in incident light while the incident light is scattered by the scattering material pieces 260. However, a quantity of light lost in this instance is quite small in comparison with a total quantity of incident light. Hence, when the advantages achieved by scattering incident light are concerned, it is preferable to use the scattering material pieces 260 in the screen 160.

Figure 3:
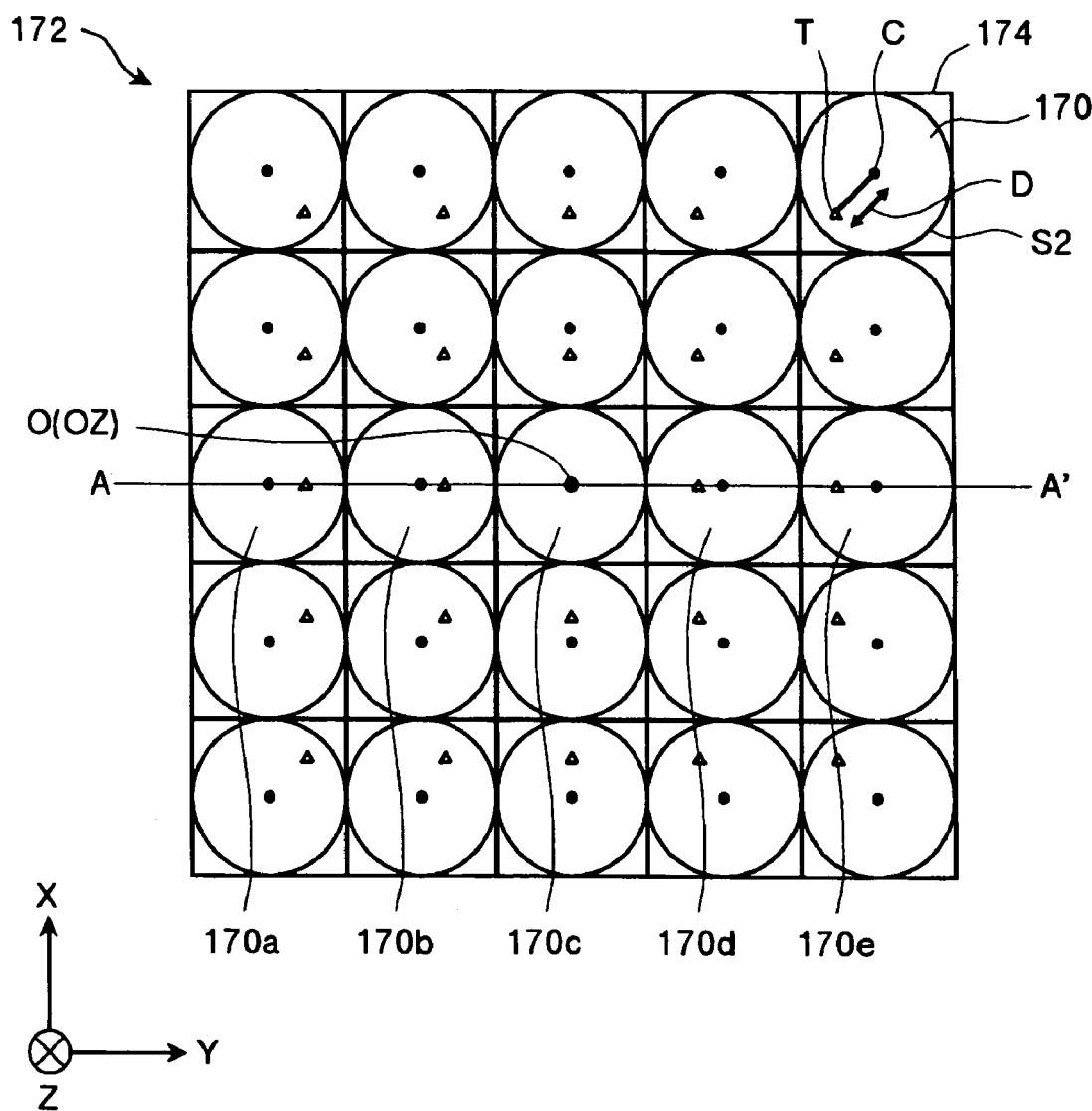
FIG. 3 is a plan view of a micro-lens array.

The micro-lens array 172 will now be described. FIG. 3 schematically shows the configuration of the micro-lens array 172, viewed from the incident side of projection light. The micro-lens array 172 can include a plurality of micro-lens elements 170 aligned on the reference plane 174. The plurality of micro-lens elements 170 can be aligned grid-wise to intersect at almost right angles on the reference plane 174. Assume that the micro-lens array 172 comprises the micro-lens elements 170 aligned in five rows and five columns for the better understandings of the micro-lens array 172. In the micro-lens array 172 shown in FIG. 3, five micro-lens elements 170 are aligned grid-wise in the X direction and in the Y direction.

All the micro-lens elements 170 can be provided on the incident side on which light goes incident, and each comprises a first surface S1 having a curvature and a second surface S2 of an almost planar shape that transmits incident light that comes incident on the first surface S1. Referring to FIG. 3, all the micro-lens elements 170 are shown by the profiles (outer periphery placed portions) of their second surfaces S2. The profile of the second surface S2 of each micro-lens element 170 is almost circular. Each micro-lens element 170 is placed so that the second surface S2 comes in contact with the reference plane 174.

The first surface S1 of each micro-lens 170 has a curvature with its convex surface oriented in the –Z direction with respect to the second surface S2. Incident light on the micro-lens array 172 goes incident on the first surface S1 of the micro-lens element 170 and comes out from the second surface S2. Incident light from the projection lens 150 is deflected to be almost parallel to the Z axis by the Fresnel lens 162 shown in FIG. 1. Light on the optical axis of the projection lens 150 shown in FIG. 1 then passes the optical axis position O on the reference plane 174.

The optical axis OZ of the projection lens 150 passes the optical axis position O on the reference plane 174 and is almost parallel to the Z axis. Details as to the reference central positions C, the apical curvature positions T, and the distances D of the micro-lens elements 170 will be described in the description about the shape of the micro-lens elements 170 below.

Figures 1, 4:
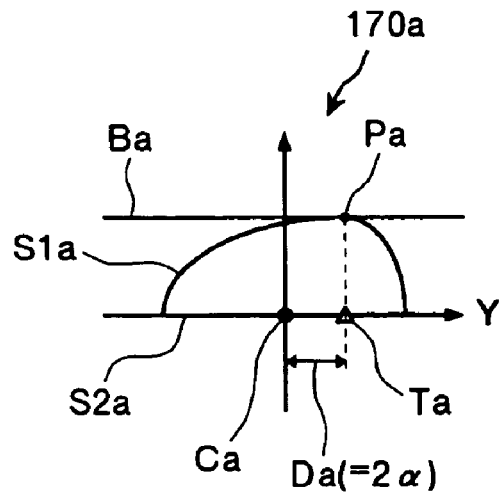
Figures 2, 4:
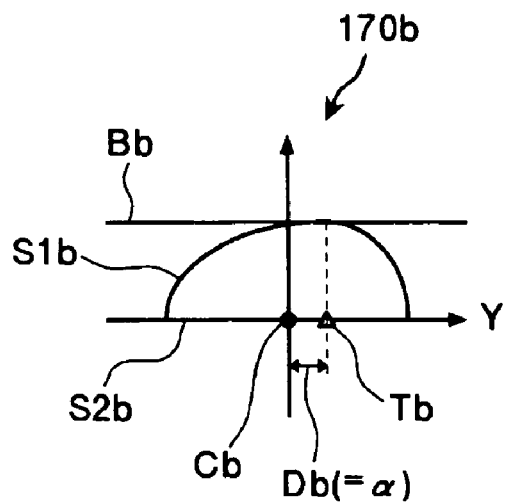
Figures 3, 4:
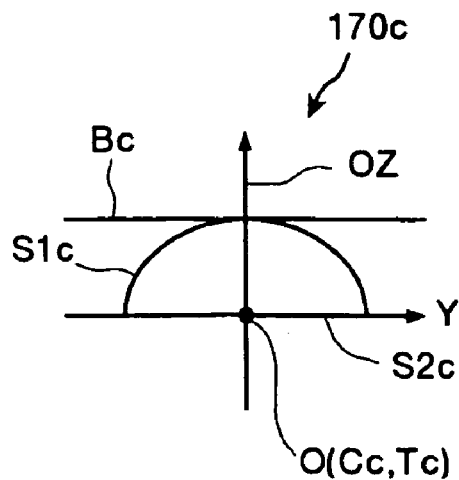
Figure 4:
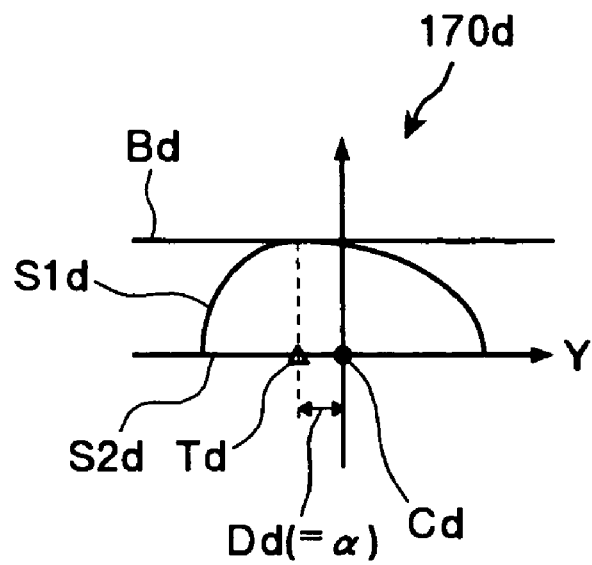
Figures 4, 5:
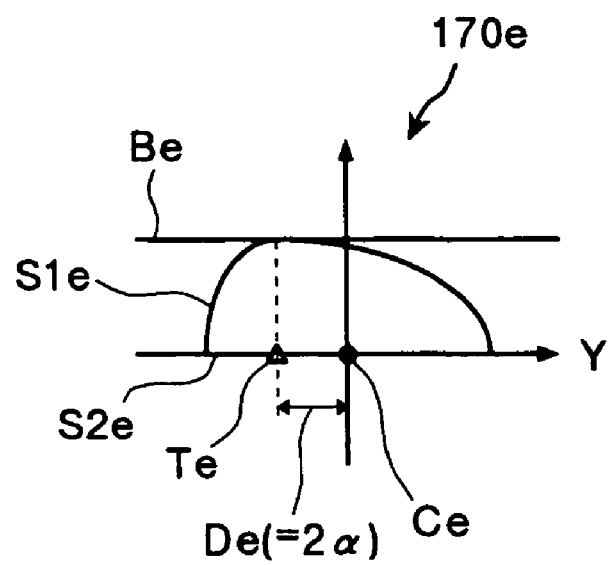
Figure 5:
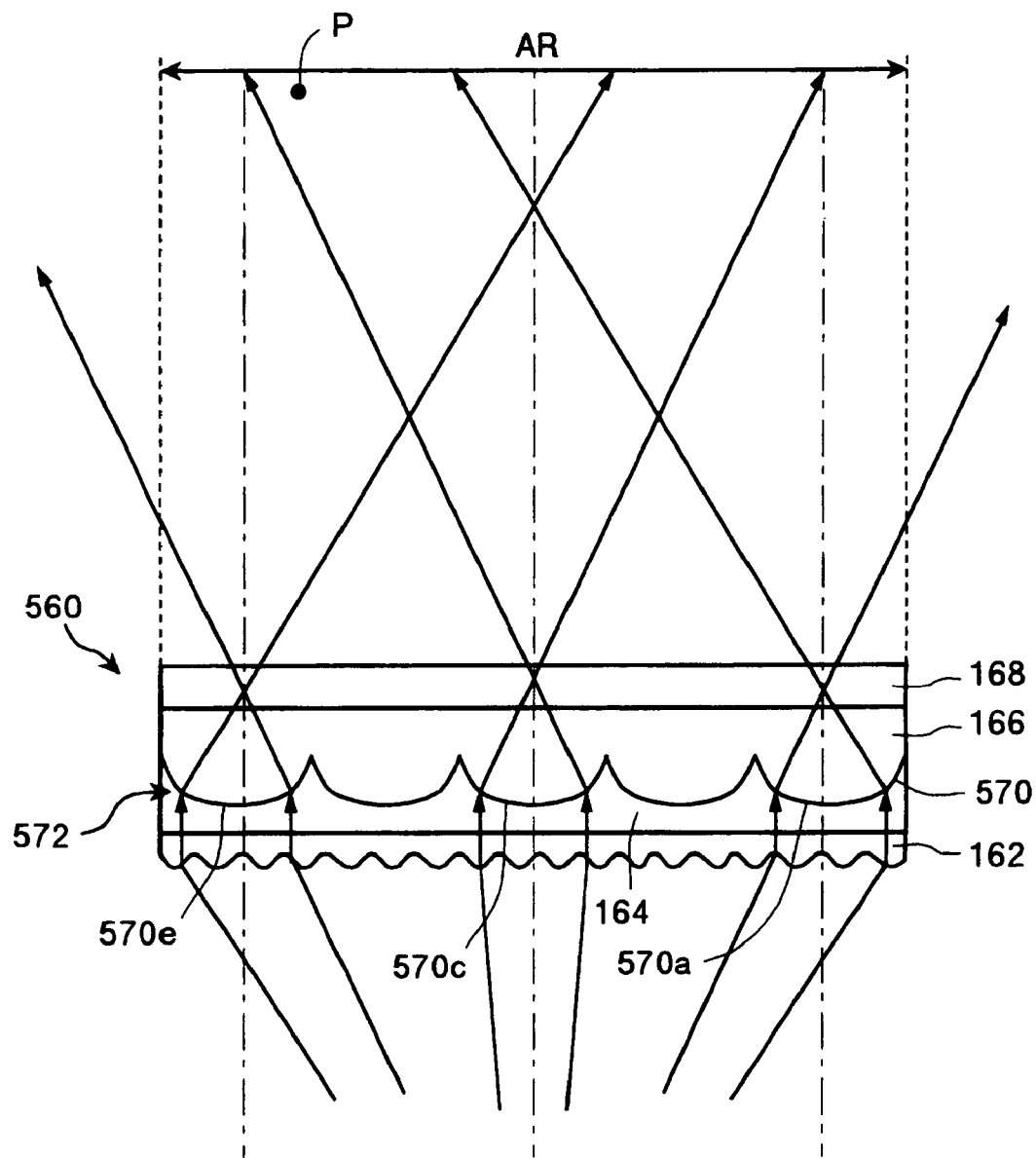

FIG. 4-1 through FIG. 4-5 are cross sections of five micro-lens elements 170a, 170b, 170c, 170d, and 170e, respectively, shown in FIG. 3, taken along the line A–A'. The five micro-lens elements 170a through 170e include first surfaces S1a, S1b, S1c, S1d, and S1e, respectively, each having a curved surface, and second surfaces S2a, S2b, S2c, S2d, and S2e, respectively, each serving as a plane coming in contact with the reference plane 174. The reference central positions Ca, Cb, Cc, Cd, and Ce are the positions almost at the centers in the regions of the second surfaces S2a through S2e of the micro-lens elements 170a through 170e, respectively. The vertical axes shown in FIG. 4 are assumed as normal lines to the second surfaces S2a through S2e passing the reference central positions Ca through Ce, respectively. In other words, the vertical axes are straight lines that pass the reference central positions Ca through Ce and are parallel to the Z axis. Also, the horizontal axes are assumed as straight lines in the Y direction on the reference plane 174.

As is shown in FIG. 4-1, the first surface S1a of the micro-lens element 170a comes in contact with a plane Ba almost parallel to the reference plane 174 at a contact point Pa. The contact point Pa is the most distant point on the first surface S1a from the second surface S2a. The apical curvature position Ta is a position of the contact point Pa projected on the reference plane 174. The micro-lens elements 170b, 170c, 170d, and 170e shown in FIG. 4-2 through FIG. 4-5, respectively, are configured in the same manner as the micro-lens element 170a, and the apical curvature positions Tb through Te can be specified from the first surfaces S1b through S1e and the planes Bb through Be, respectively.

The shape of the micro-lens element 170c shown in FIG. 4-3 will be described first. The micro-lens element 170c is placed so that the reference central position Cc almost agrees with the optical axis position O. The first surface S1c of the micro-lens element 170c is of an almost rotationally symmetrical shape with respect to the normal line to the second surface S2c passing the reference central position Cc, that is, the optical axis OZ. The first surface S1c is an aspheric surface with a cross section of an elliptical shape as is shown in FIG. 4. Because the first surface S1c is of an almost rotationally symmetrical shape, the apical curvature position Tc agrees with the reference central position Cc.

The shape of the micro-lens elements 170 other than the micro-lens element 170c will now be described using the micro-lens element 170a shown in FIG. 4-1 and the micro-lens element 170b shown in FIG. 4-2 as examples. As is shown in FIG. 3, of all the micro-lens elements 170a through 170e, the micro-lens element 170a is placed at the position on the edge on the –Y side. The apical curvature position Ta of the micro-lens element 170a is a position moved from the reference central position Ca in the +Y direction by a length Da. The first surface S1a is of an asymmetrical shape inflected in the +Y direction with respect to the normal line to the second surface S2a passing the reference central position Ca. As is shown in FIG. 3, the reference central position Ca of the micro-lens element 170a is positioned in the –Y direction of the optical axis position O. The orientation of the optical axis position O on the reference plane 174 with respect to the reference central position Ca of the micro-lens element 170a and the orientation of the apical curvature position Ta with respect to the reference central position Ca are in the identical, +Y direction. In this manner, the micro-lens element 170a is made into a shape, in which the apical curvature position Ta is decentered by being moved according to the position of the micro-lens 170a with respect to the optical axis position O, which is the predetermined position on the reference plane 174.

As is shown in FIG. 3, the micro-lens element 170b is placed at the position between the micro-lens element 170a and the micro-lens element 170c. As with the micro-lens element 170a, the orientation of the optical axis position O on the reference plane 174 with respect to the reference central position Cb of the micro-lens element 170b is the +Y direction. Hence, the apical curvature position Tb of the micro-lens element 170b is at a position moved from the reference central position Cb in the +Y direction. Hence, as with the first surface S1a, the first surface S1b is of an asymmetrical shape inflected in the +Y direction with respect to the normal line to the second surface S2b passing the reference central position Cb. Further, the reference central position Cb of the micro-lens element 170b is a position at almost the center between the reference central position Ca of the micro-lens element 170a and the optical axis position O. The distance from the reference central position Cb of the micro-les element 170b to the optical axis position O is almost half the distance from the reference central position Ca of the micro-lens element 170a to the optical axis position O. A distance Db between the reference central position Cb and the apical curvature position Tb of the micro-lens element 170b is equal to a length α, which is almost half a length 2α, that is, a distance Da between the reference central position Ca and the apical curvature position Ta of the micro-lens element 170a. As has been described, the distance between the reference central position Cb of the micro-lens element 170b and the optical axis position O, and the distance between the reference central position Cb and the apical curvature position Tb are almost proportional. In this manner, the micro-lens elements 170a and 170b are made into the shapes, in which the apical curvature positions Ta and Tb are decentered by being moved according to the distances between the optical axis position O and the micro-lens elements 170a and 170b, respectively.

As has been described, the first surfaces S1a and S1b are made into shapes having curvatures, by which the reference central positions Ca and Cb and the apical curvature positions Ta and Tb are varied by predetermined distances in a predetermined direction. As is shown in FIG. 4, as with the micro-lens elements 170a and 170b, the micro-lens elements 170d and 170e are made into shapes having curvatures, by which the central reference positions Cd and Ce and the apical curvature positions Td and Te are varied by predetermined distances Dd and De, respectively, in a predetermined direction. Further, the shapes of other micro-lens elements 170 shown in FIG. 3 can be determined in the same manner as the micro-lens elements 170a and 170b. For each micro-lens element 170 shown in FIG. 3, the apical curvature position T is set to the position at a predetermined distance D in a predetermined direction with respect to the reference central position C.

Deflection of incident light by the micro-lens array 172 will now be described with reference to FIG. 5, FIG. 6 and FIG. 7-1 through FIG. 7-3. In comparison with the micro-lens array 172 in the screen 160 of this exemplary embodiment, deflection of incident light by a micro-lens array 572 in a related screen 560 will be described with reference to FIG. 5. The micro-lens array 572 can include a plurality of micro-lens elements 570. All the micro-lens elements 570 are of substantially the same shape. Because all the micro-lens elements 570 are of substantially the same shape, incident light converted to almost parallel beams of light in the Fresnel lens 162 is refracted by the respective micro-lens elements 570, and scatters about the micro-lens elements 570. Because outgoing light from the respective micro-lens elements 570 scatters in the central region of an area AR, it is possible to observe a satisfactory projection image at the central position of the area AR. On the contrary, in a region remote from the center of the area AR, outgoing light from a part of the micro-lens elements 570 fails to travel in a satisfactory manner. Hence, at a position remote from the center of the area AR, there may be a case where a homogeneous projection image cannot be observed. For example, at the observation point P, outgoing light from the micro-lens element 570c and the micro-lens element 570e can be observed in a satisfactory manner. On the contrary, outgoing light from the micro-lens element 570a fails to travel in a satisfactory manner in a direction to the observation point P. Hence, there may be a case where outgoing light from the micro-lens element 570a is so weak that a projection image observed as a whole at the observation point P is inhomogeneous.

In order to prevent such an inconvenience, for the related screen 560 of some type, the light scattering angle of the micro-lens elements 570 in the peripheral portion of the screen 560 is set larger than the light scattering angle of the micro-lens elements 570 in the central portion of the screen 560. However, when the light scattering angle of the micro-lens elements 570 in the peripheral portion of the screen 560 is set larger, more of light from the micro-lens elements 570 in the peripheral portion of the screen 560 travels to an area different from the area AR where the viewers are present. When light traveling to an area different from the area AR is increased, light utilization is reduced, which may cause a projection image observed in the area AR to become darker.

Figure 6:
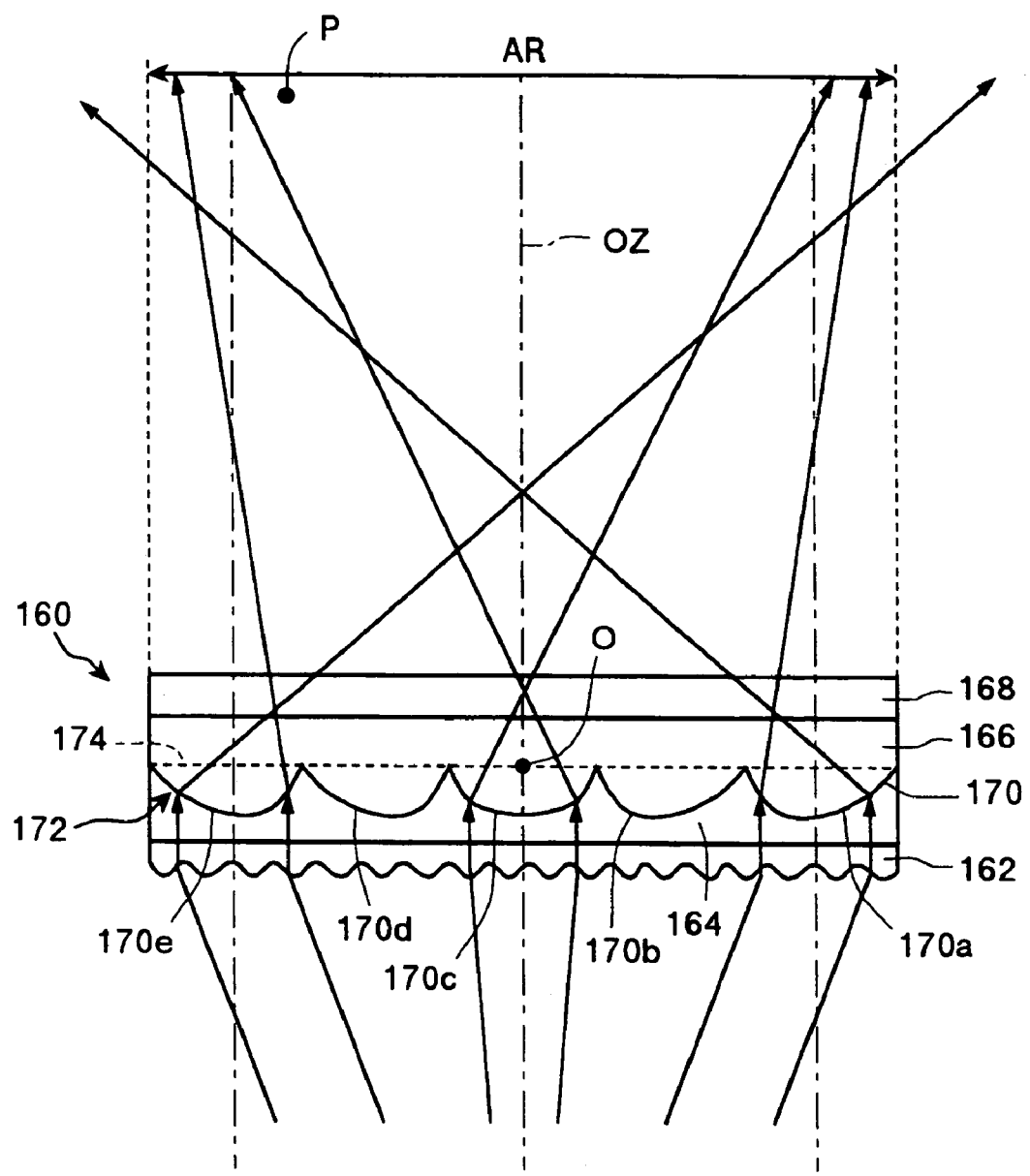
FIG. 6 is an explanatory view of deflection of incident light by a screen in a projector according the first exemplary embodiment.
Figures 1, 7:
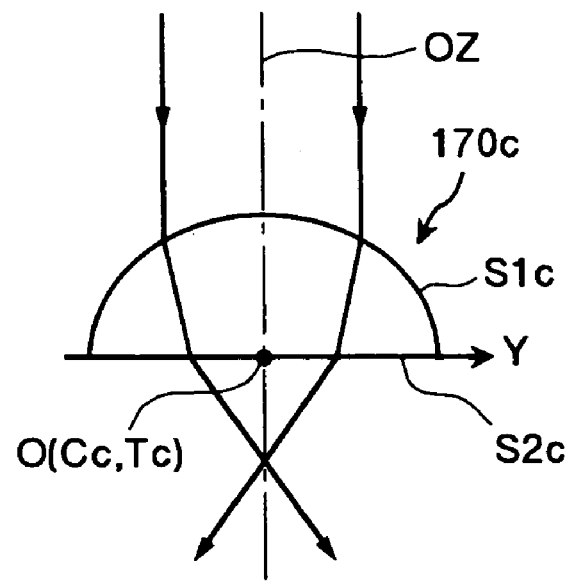
Figures 2, 7:
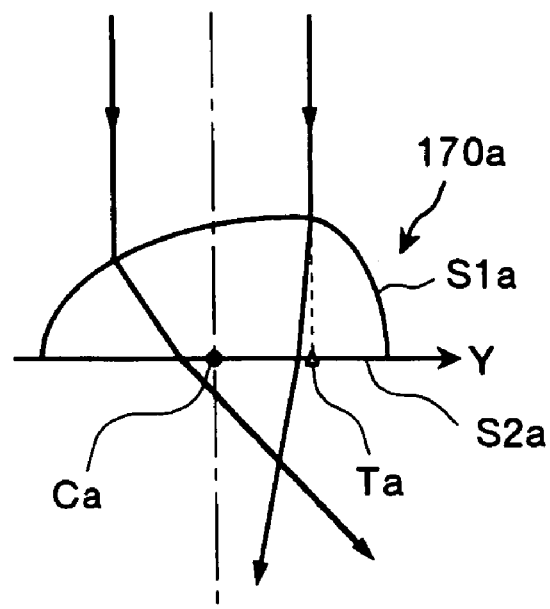
Figures 3, 7:
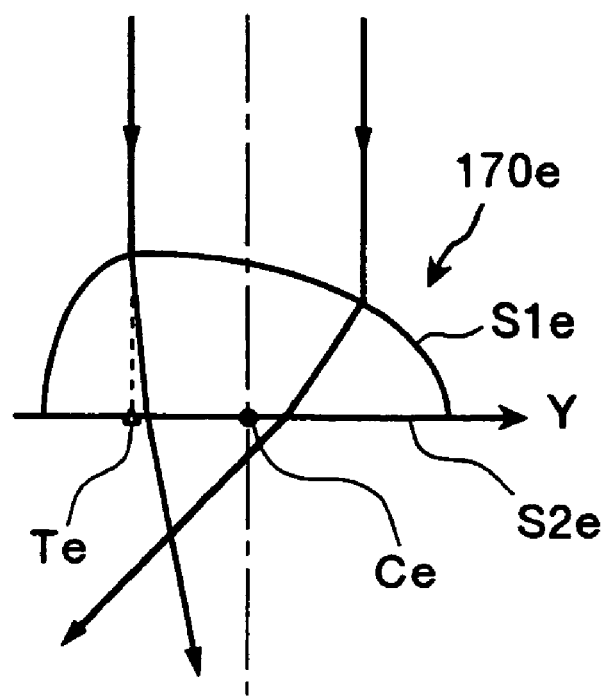

FIG. 6 shows an example of deflection of incident light by the screen 160 in the projector 100 of this exemplary embodiment. Herein, deflection of incident light will be described using the micro-lens elements 170a through 170e in the micro-lens array 172 as representatives. Projection light from the projection lens 150 (see FIG. 1) is converted to almost parallel beams of light in the Fresnel lens 162, and the light then goes incident on the micro-lens array 172. Light that comes incident in the vicinity of the optical axis O of the micro lens array 172 (see FIG. 3) goes incident on the micro-lens element 170c. As described above, the first surface S1c of the micro-lens element 170c is of an almost rotationally symmetrical shape with respect to the optical axis OZ. Hence, as is shown in FIG. 7-1, light that comes incident on the micro-lens element 170c is refracted so as to be focused at a position on the optical axis OZ. Subsequently, as is shown in FIG. 6, light that comes incident on the micro-lens element 170c goes out in a range having the optical axis OZ almost at the center.

As is shown in FIG. 7-2, the first surface S1a of the micro-lens element 170a has a curvature, by which the apical curvature position Ta is varied by a predetermined distance in the +Y direction with respect to the reference central position Ca in corresponding to the position of the optical axis position O with respect to the reference central position Ca. Hence, light that comes incident on the micro-lens element 170a is refracted to be focused at the position distant by a certain distance in the +Y direction with respect to the normal line to the second surface S2a. Subsequently, as is shown in FIG. 6, light that comes incident on the micro-lens element 170a is refracted to travel in a direction to the optical axis OZ. In this manner, the micro-lens element 170a deflects incident light in a direction to the area AR where the viewers are present.

As is shown in FIG. 7-3, the first surface S1e of the micro-lens element 170e has a curvature, by which the apical curvature position Te is varied by a predetermined distance in the −Y direction with respect to the reference central position Ce in corresponding to the position of the optical axis position O with respect to the reference central position Ce. Hence, light that comes incident on the micro-lens element 170e is refracted so as to be focused at the position distant by a certain distance in the −Y direction with respect to the normal line to the second surface S2e. Subsequently, as is shown in FIG. 6, light that comes incident on the micro-lens element 170e is refracted to travel in a direction to the optical axis OZ. In this manner, the micro-lens element 170e deflects incident light in a direction to the area AR where the viewers are present. As has been described, light that comes incident on each of the micro-lens elements 170c, 170a, and 170e travels in a direction to the area AR. In this instance, outgoing light from each of the micro-lens elements 170c, 170a, and 170e can be observed in a satisfactory manner at the observation position P. As to the micro-lens elements 170a and 170e in the peripheral portion of the screen 160, because incident light is refracted in a direction to the optical axis OZ, a quantity of light that travels to an area different from the area AR can be reduced.

As has been described, the micro-lens elements 170 positioned in the peripheral portion of the screen 160 are of the shapes decentered according to the positions of the micro-lens elements 170 on the reference plane 174. Hence, as with the micro-lens element 170a and the micro-lens element 170e described above as examples, the respective micro-lens elements 170 are able to allow incident light to travel in a direction to the optical axis OZ. In particular, a rear type projector, such as the projector 100, can reduce the thickness of the case 180 by allowing projection light from the projection lens 150 to go incident on the reflection mirror 152 or the screen 160 in a diagonal direction. In a case where incident light is allowed to go incident in a diagonal direction, it is possible to allow incident light to travel in a desired direction by using the micro-lens array 172. When the respective micro-lens elements 170 are able to allow the incident light to travel in a desired direction, it is possible to concentrate incident light on the screen 160 in the specific area AR where the viewers are present, which makes it possible to extend the distribution of outgoing light from the respective micro-lens elements 170 within the area AR. By concentrating incident light on the screen 160 in the specific area AR, a bright projection image can be obtained by preventing a reduction in light utilization. In addition, it is possible to observe outgoing light from the respective positions on the screen 160 in an adequate quantity of light in a wide range across the area AR, which can in turn make a projection image homogenous. Hence, there can be achieved an advantage that it is possible to observe a bright, homogeneous projection image in a wide range across the area where the viewers are present.

By providing the Fresnel lens 162 to the screen 160, it is possible for incident light, converted to almost parallel beams of light in the Fresnel lens 162, to go incident on the micro-lens array 172. Because almost parallel beams of light go incident on the micro-lens array 172, when the Fresnel lens 162 is provided, the respective micro-lens elements 170 to deflect incident light to a desired direction can be designed easily. As a result, there can be achieved an advantage that the screen 160 can be designed easily.

Figure 8:
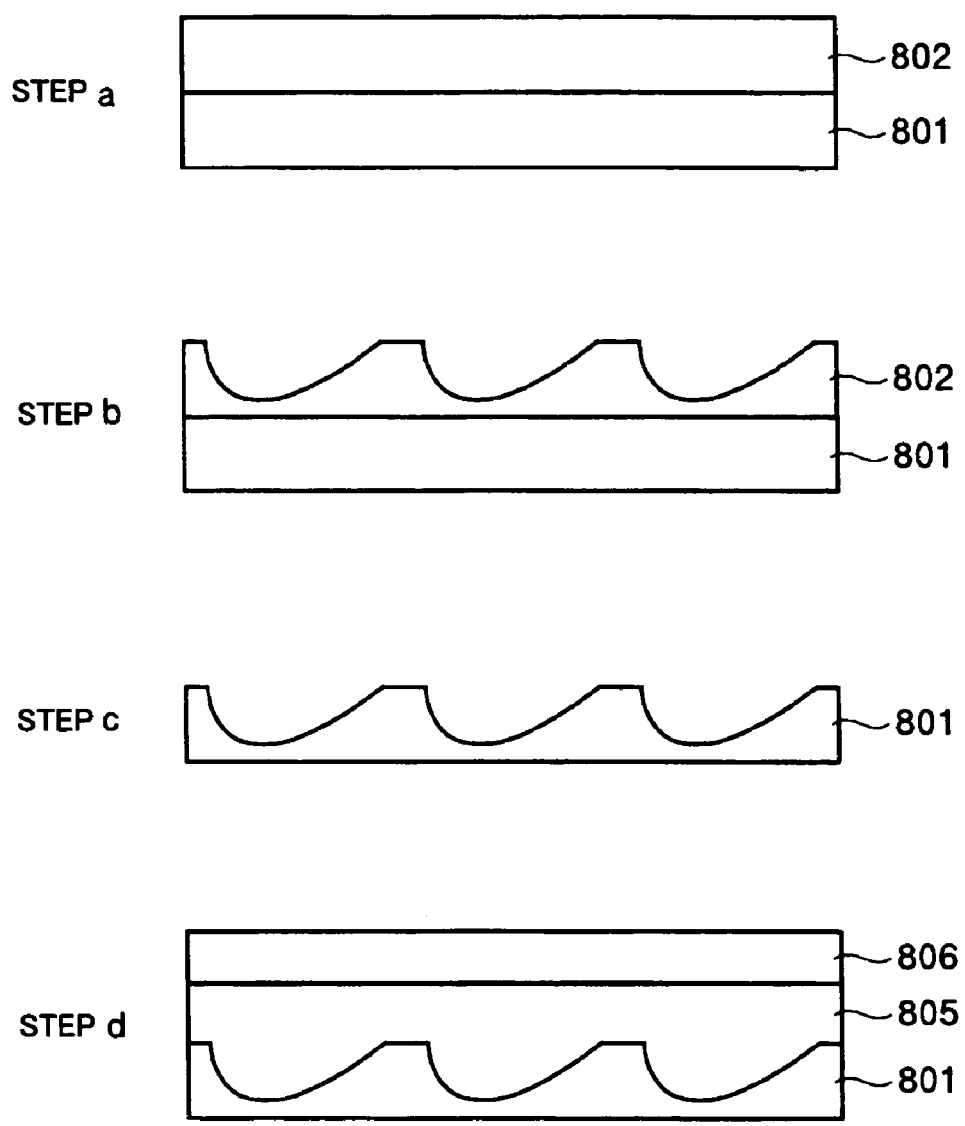
FIG. 8 is an explanatory view of a first manufacturing method of the micro-lens array.

A first manufacturing method and a second manufacturing method of the micro-lens array 172 will now be described with reference to FIG. 8, FIG. 9-1 and FIG. 9-2. FIG. 8 shows the procedure in the first manufacturing method of the micro-lens array 172. Firstly, in the step a, a resist layer 802 is formed on a substrate 801. Then, in the step b, concave portions of the shapes corresponding to desired shapes for the respective micro-lens elements 170 are made in the resist layer 802 on the substrate 801 through the gray-scale lithographic technique. The gray-scale lithography is performed, for example, by irradiating a laser beam of a specific wavelength to photosensitive glass to allow a photosensitive layer to undergo degeneration in forming a mask having light transmittance that differs continuously from location to location. Initially, a layer whose light transmittance is varied continuously to correspond to the desired lens shapes is formed on photosensitive glass in the shapes of the micro-lens elements 170. The photosensitive glass lowers the light transmittance as a result of degeneration. The resist layer 802 is exposed by allowing an exposure light beam to pass through the photosensitive glass. The exposure light beams pass through the photosensitive glass more in a portion where a change in light transmittance is small. Hence, the resist layer 802 is exposed more intensely by the exposure light beams having passed through the photosensitive glass in a layer where a change in light transmittance is small. For example, in a case where the positive type resist is used, portions exposed more intensely by the exposure light beams is removed when developed, and desired lens shapes are thereby formed on the resist layer 802. In this manner, it is possible to form the concave portions in the shapes of the first surfaces S1 of the micro-lens elements 170 in the resist layer 802. Besides the photosensitive glass, an area gray-scale mask can be used for the gray-scale lithography. The area gray-scale mask is a method for varying exposure areas step by step according to desired shapes.

In the step c, dry etching is performed using a fluorine-based gas, such as $CHF_3$ and $CF_4$, while the concave portions in the shapes of the first surfaces S1 of the micro-lens elements 170 are formed in the resist layer 802. Through the dry etching, the shape of the resist layer 802 can be transferred onto the substrate 801. It is thus possible to form the concave portions in the shapes of the first surfaces S1 of the micro-lens elements 170 in the substrate 801. Subsequently, in the step d, an optically transparent resin layer 805 is formed on the substrate 801, in which the concave portions in the shapes of the first surfaces S1 of the micro-lens elements 170 have been formed. By forming the optically transparent resin layer 805 over the concave portions in the substrate 801, the micro-lens elements 170 of an asymmetric shape can be formed. Further, in the step d, by forming a scattering layer 806 on the optically transparent resin layer 805, the micro-lens array 172 can be achieved.

Figures 1, 9:
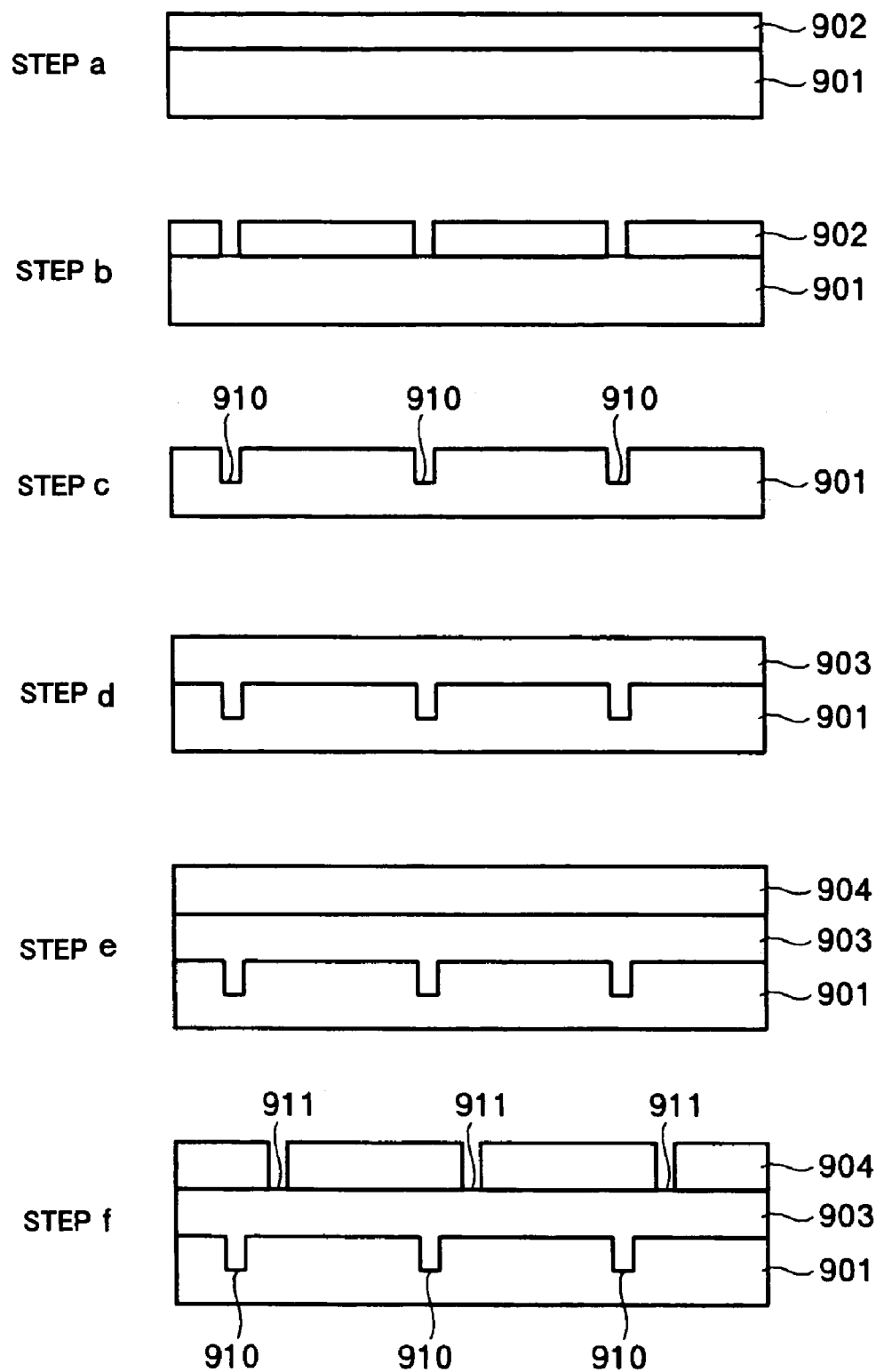
Figures 2, 9:
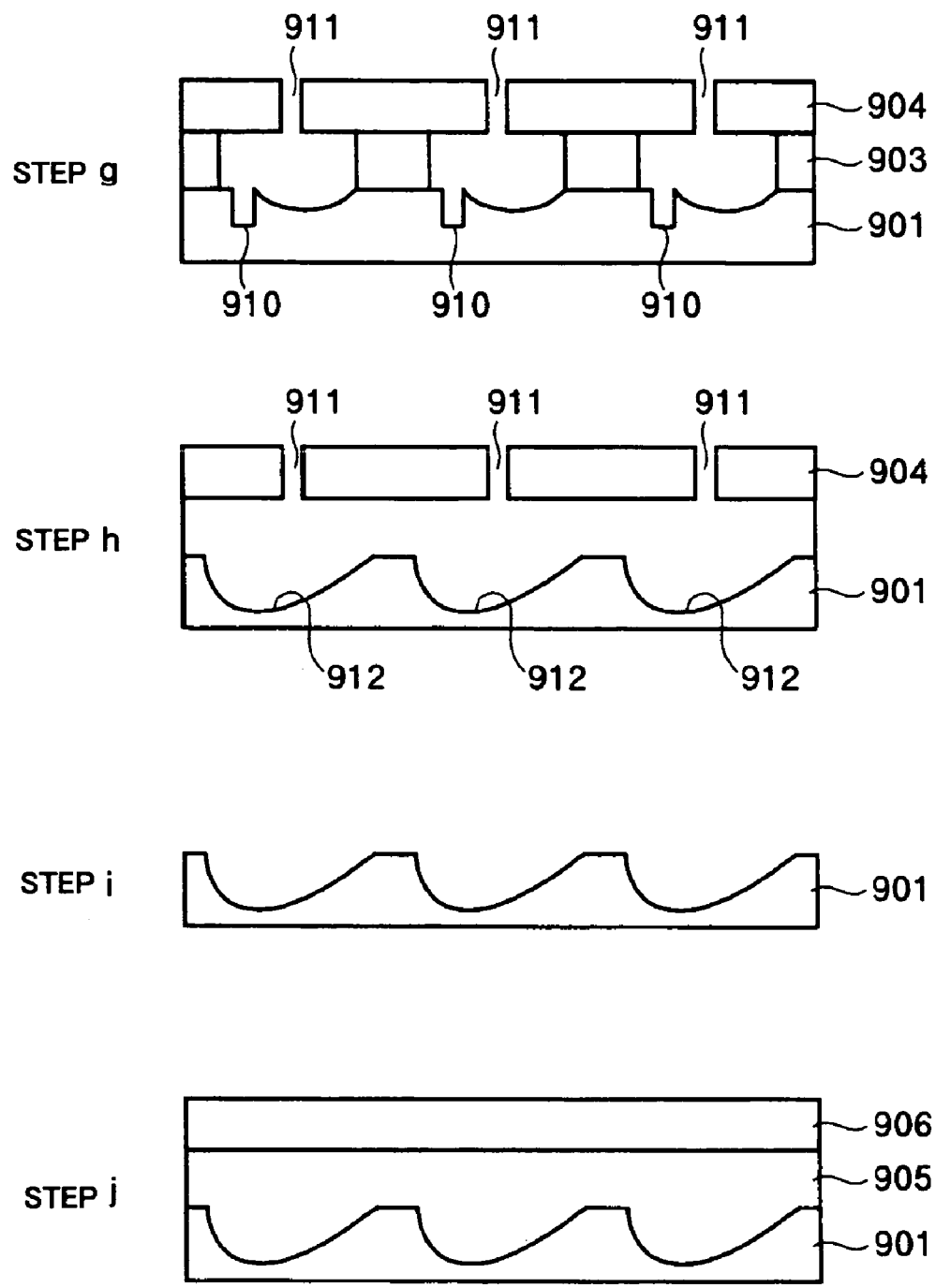

The second manufacturing method of the micro-lens array 172 will now be described with reference to FIG. 9-1 and FIG. 9-2. Initially, in the step a, a resist layer 902 is formed on a substrate 901.

Subsequently, in the step b, the resist layer 902 formed on the substrate 901 is patterned.

Subsequently, in the step c, as with the first manufacturing method, the resist layer 902 and the substrate 901 are etched away by dry etching. Concave portions 910 are thereby formed in the substrate 901. The positions of the concave portions 910 formed in the substrate 901 are substantially the same as the positions of the patterned portions in the resist layer 902. Subsequently, in the step d, a sacrifice layer 903 having an etching rate different from the etching rate of the substrate 901 is formed on the substrate 901 in which the concave portions 910 have been formed. The sacrifice layer 903 is a film having a higher etching rate than the substrate 901, and for example, it is silicon dioxide or the like having a higher etching rate than glass. Subsequently, in the step e, a mask layer 904 is formed on the sacrifice layer 903. The mask layer 904 is made of, for example, polysilicon or chromium, or alloy thereof. Further, in the step f, the mask layer 904 is patterned by means of photolithography or dry etching as described above, or by laser light, to form penetration portions 911. The penetration portions 911 are formed in such a manner that the positions of the penetrations portion 911 in the mask layer 904 are different from the positions of the concave portions 910 in the substrate 901.

Subsequently, in the step g shown in FIG. 9-2, the sacrifice layer 903 and the substrate 901 are subjected to etching. The etching is performed through the penetration portions 911 formed in the mask layer 904. The sacrifice layer 903 is first etched away almost concentrically about the penetration portions 911 in the mask layer 904. When regions being etched away reach the substrate 901, the substrate 901 is then etched away about the positions almost on the normal lines to the penetration portions 911. In this instance, because the etching rate of the sacrifice layer 903 is higher than that of the substrate 901, the etching speed of the substrate 901 is slower than the etching speed of the sacrifice layer 903. The concave portions 910 are filled with the sacrifice layer 903 having an etching rate different from that of the substrate 901. Hence, once the regions being etched away reach the concave portions 910 in the substrate 901, the concave portions 910 are etched away faster than the substrate 901. Because the concave portions 910 are etched away faster, the central positions of regions being etched away are decentered in a direction to the concave portions 910 from nearly the concentric positions of the penetration portions 911. By causing the central positions of the regions being etched away to decenter in a direction to the concave portions 910 in this manner, it is possible to form concave portions 912 of an asymmetric shape in the substrate 901 in the step h.

Further, in the step i, the mask layer 904 and the sacrifice layer 903 are removed to leave the substrate 901 alone, in which the concave portions 912 of an asymmetric shape have been formed. The mask layer 904 and the sacrifice layer 903 can be removed by wet etching using a solution of hydrofluoric acid. Subsequently, in the step j, an optically transparent resin layer 905 is formed over the concave portions 912 of an asymmetric shape formed in the substrate 901. Further, by forming a scattering layer 906 on the optically transparent resin layer 905, the micro-lens array 172 can be achieved. In this manner, it is possible to form the micro-lens elements 170 of an asymmetric shape.

It should be appreciated that the manufacturing method of the concave portions 912 of an asymmetric shape is not limited to the forming method by which the direction and the distance are varied between the positions of the concave portions 910 and the positions of the penetration portions 911. For example, the concave portions 910 may be formed shallow in a large area in the substrate 901 without providing the sacrifice layer 903. In this case, too, the apical curvature positions T of the micro-lens elements 170 can be varied through pattering and etching while providing the penetration portions 911 in the mask layer 904 at positions different from the positions of the concave portions 910. Further, a plurality of concave portions 910 may be provided for a single shape of the first surface S1 of the micro-lens elements 170 without providing the sacrifice layer 903. In this case, by performing the etching while varying the number and the positions of the concave portions 910, it is possible to vary the apical curvature positions T of the micro-lens elements 170. Further, the lens array 172 manufactured according to the first manufacturing method or the second manufacturing method can be copied onto the substrate 801 or 901 by so-called 2P transfer using UV-cured resin, hot-press, injection molding, and the like.

Figures 1, 10:
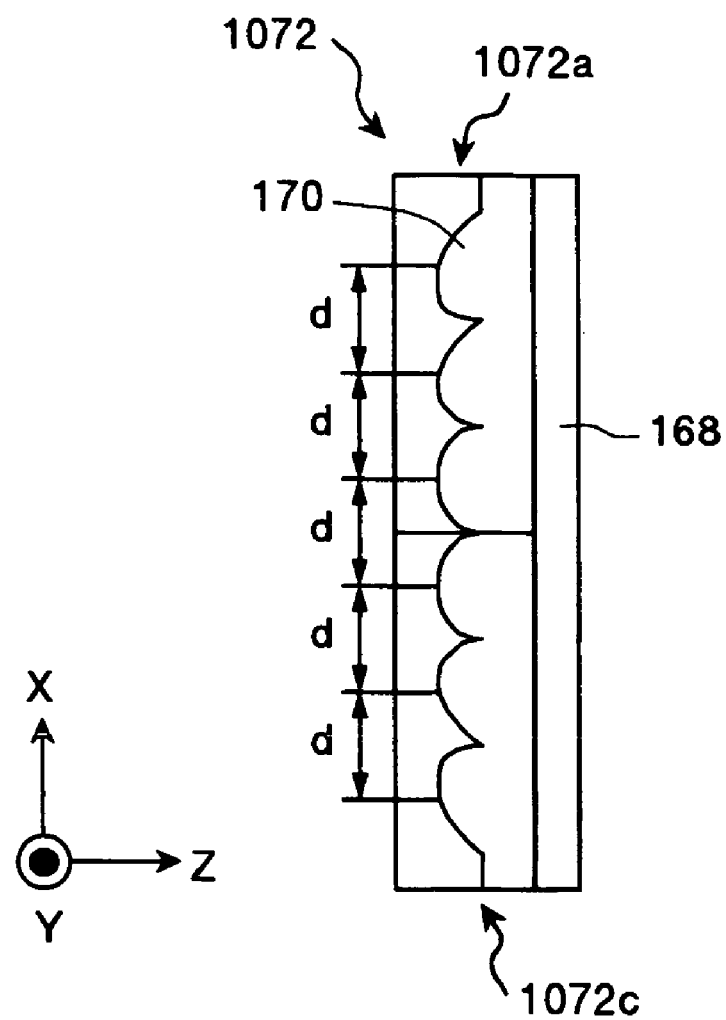
Figures 2, 10:
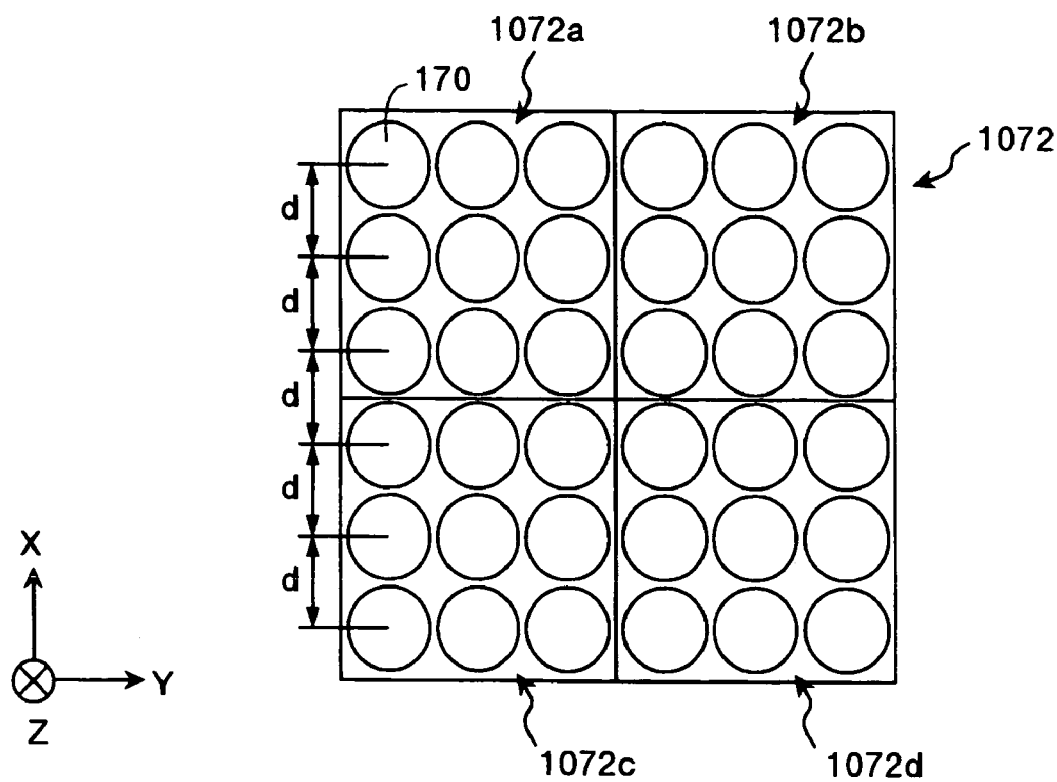

FIG. 10-1 and FIG. 10-2 schematically show the configuration of a micro-lens array 1072 comprising four micro-lens arrays 1072a, 1072b, 1072c, and 1072d. The micro-lens array 1072 is manufactured by laminating four micro-lens arrays 1072a through 1072d, which are manufactured by the first manufacturing method or the second manufacturing method described above, aligned in two directions, the X direction and the Y direction, that intersect almost at right angles. For example, for the micro-lens elements 170, the second surfaces S2 (see FIG. 3) are formed to have the diameter in the order of tens to several hundreds μm. Hence, when a 60-inch screen 160 is manufactured, it is difficult to manufacture the micro-lens array by forming micro-lens elements 170 having the diameter in the order of tens to several hundreds μm on the entire surface of a single 60-inch substrate.

Hence, by adopting a manufacturing method for laminating a plurality of micro-lens arrays manufactured individually to each other, a large-scale screen 160 can be manufactured easily. It is preferable to make intervals d among the micro-lens elements 170 positioned at the joints of the respective micro-lens arrays 1072a through 1072d almost equal to intervals d among the micro-lens elements 170 at the other positions. When configured in this manner, deflection of incident light can be homogeneous across the entire micro-lens array 1072, which makes it possible to display a homogeneous projection image across the entire screen 160.

Figure 11:
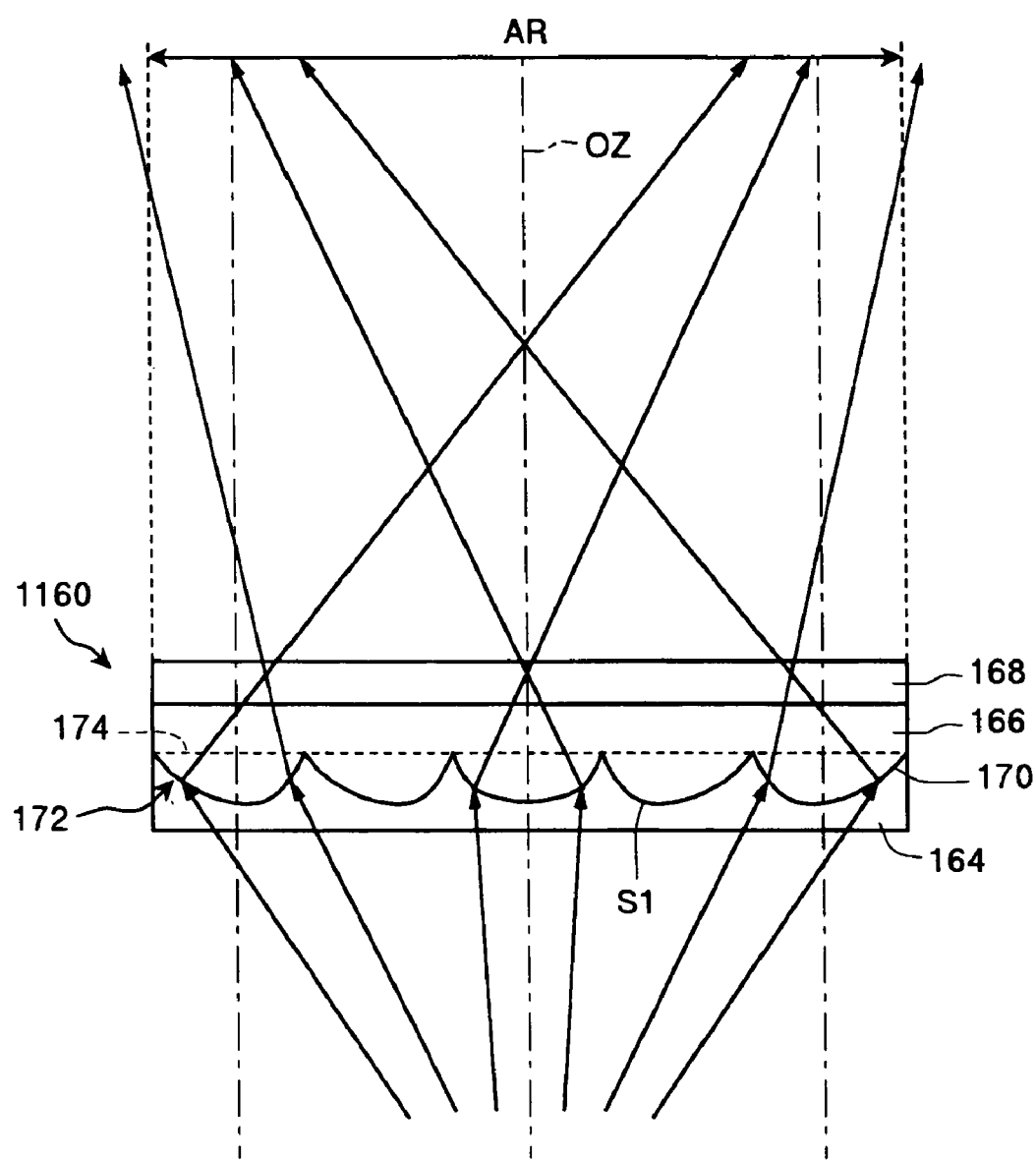
FIG. 11 is an explanatory view of deflection of incident light by a screen according to a second exemplary embodiment of the invention.

FIG. 11 shows an example of deflection of incident light by a screen 1160 according to a second exemplary embodiment of the invention. The screen 1160 can be adapted to the projector 100 according to the first exemplary embodiment above. Like components are labeled with like reference numerals with respect to the projector 100 and the screen 160 in the first exemplary embodiment above, and the explanation will not be repeated. The screen 1160 of this exemplary embodiment can be characterized in that a Fresnel lens is not provided, and instead, light from the projection lens 150 (see FIG. 1), which has not been converted to parallel beams of light, goes incident on the micro-lens array 172. The first surface S1 of each micro-lens element 170 is of a shape such that allows incident light from the projection lens 150 to travel to the specific area AR where the viewers are present. Each micro-lens element 170 is thus able to allow incident light other than almost parallel beams of light to travel to the area AR without the need to provide a Fresnel lens.

The Fresnel lens is not able to diffract incident light to a desired direction unless the incident angle is the pre-set angle, and thereby allow the incident light to travel in a direction other than the desired direction. Also, the Fresnel lens generates diffracted light of unwanted orders due to the diffraction function. The diffracted light of unwanted orders travels in a direction other than the desired direction. Hence, when the Fresnel lens is used, part of incident light fails to travel in the desired direction, which gives rise to a loss in quantity of light. That is to say, when the need for the Fresnel lens is eliminated, there is no loss in quantity of light caused by the Fresnel lens as described above, and light utilization can be improved. Also, by eliminating the need for the Fresnel lens, the number of components can be reduced, and the screen can be of an inexpensive, simple configuration. Hence, there can be achieved an advantage that the screen can be of an inexpensive, simple configuration while improving light utilization.

Figure 12:
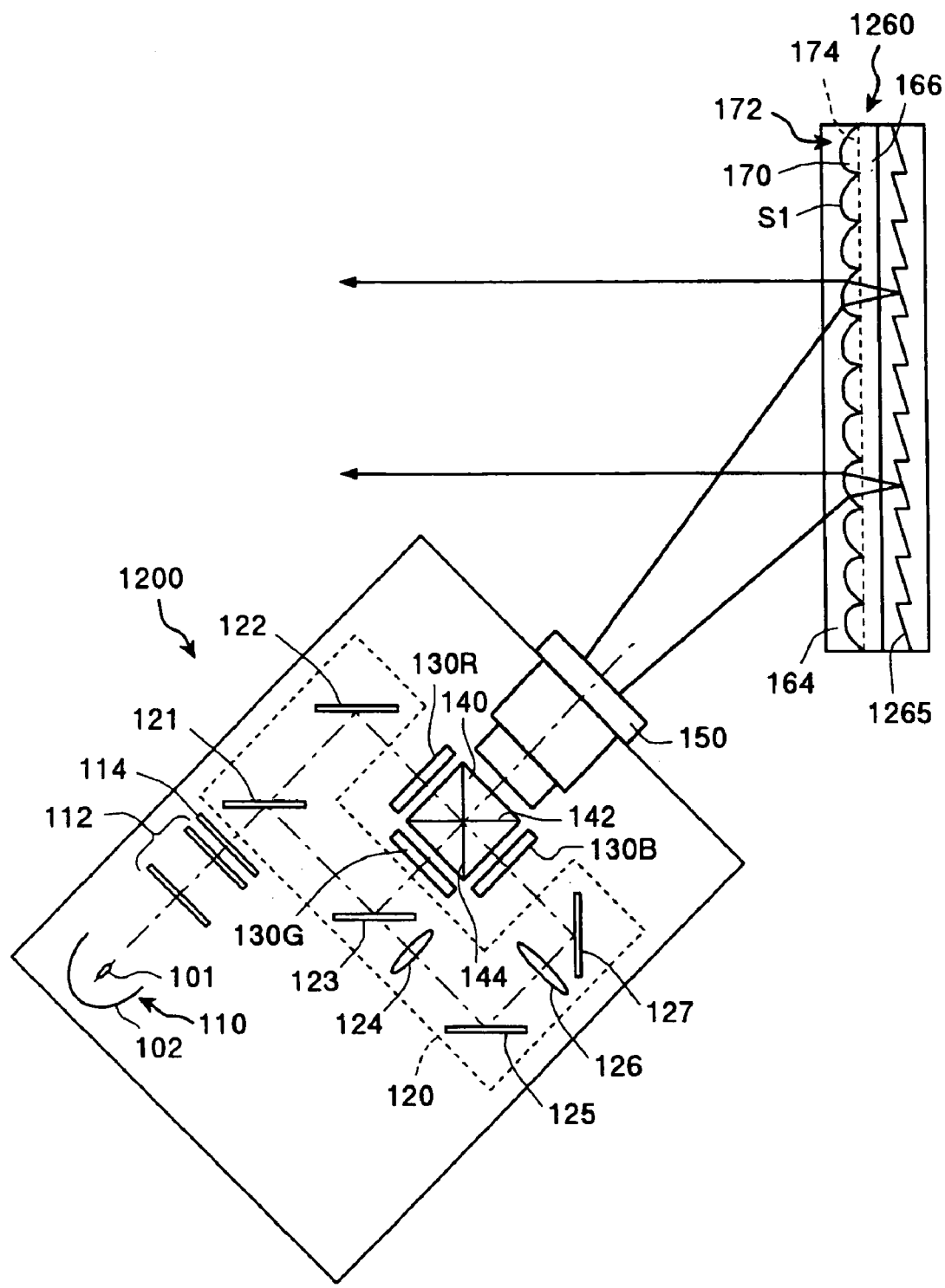
FIG. 12 is a view schematically showing the configuration of a screen according to a third exemplary embodiment of the invention.

FIG. 12 shows a schematic configuration of a screen 1260 according to a third exemplary embodiment of the invention, and an example of deflection of incident light from a projector 1200. Like components are labeled with like reference numerals with respect to the projector 100 and the screen 160 in the first exemplary embodiment above, and the explanation will not be repeated. The screen 1260 of this exemplary embodiment is a reflective screen used together with a so-called front projection type projector 1200. The projector 1200 is of substantially the same configuration as the configuration of the projector 100 (see FIG. 1) to project light emitted from the light source 110 by means of the projection lens 150.

The screen 1260 includes the micro-lens array 172 including a plurality of micro-lens elements 170. Light that comes incident on the screen 1260 from the projector 1200 is refracted on the first surfaces S1 of the micro-lens elements 170, and travels in a direction to a reflection surface 1265. The reflection surface 1265 is formed as a blaze type. Incident light that has traveled in a direction to the reflection surface 1265 is reflected on the reflection surface 1265, and travels again in a direction to the micro-lens elements 170. Light that has traveled in a direction to the micro-lens elements 170 from the reflection surface 1265 goes incident on the first surfaces S1 from a direction opposite to the direction in which it went incident on the screen 1260. Light that comes incident on the first surfaces S1 from the reflection surface 1265 is refracted on the first surfaces S1, and then travels in a direction to a specific area where the viewers are present. The substrate 164 may be a scattering layer including the scattering material pieces 260 (see FIG. 2) used in the screen 160 of the first embodiment.

The screen 1260 is able to reflect incident light to a specific area by adjusting the blaze angle of the reflection surface 1265 and the shapes of the first surfaces S1 of the respective micro-lens elements 170. Hence, by providing the micro-lens array 172 together with the reflection surface 1265, the screen 1260 becomes able to allow incident light from the projector 1200 to travel in a direction to a specific area where the viewers are present. Hence, there can be achieved an advantage that a bright, homogeneous projection image can be observed in a wide range across the area where the viewers are present.

Figure 13:
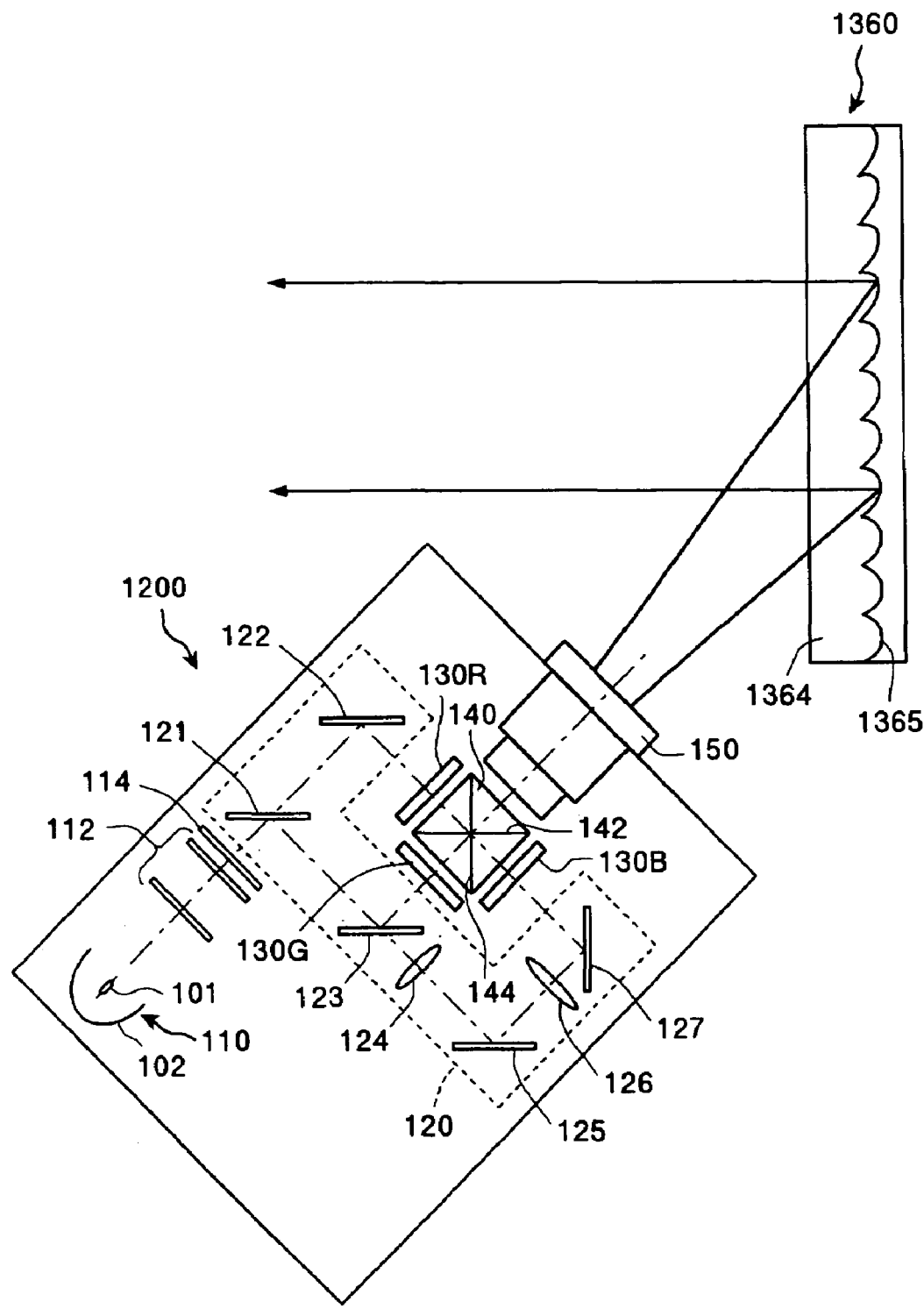
FIG. 13 is a view schematically showing the configuration of a modification of the screen according to the third embodiment.

FIG. 13 shows an example when incident light from the projector 1200 is deflected on a screen 1360 of a modified configuration of the screen 1260 of this exemplary embodiment. The screen 1360 is provided with a reflection surface 1365 having concave portions in the shape of the first surfaces S1 of the respective micro-lens elements 170 in the screen 1260. The reflection surface 1365 is provided so that the surface provided with the concave portions in the shape of the first surfaces S1 is oriented in a direction to the viewers. A substrate 1364 is provided to the reflection surface 1365 on the viewers' side. The substrate 1364 may be a scattering layer including the scattering material pieces 260 (see FIG. 2) used in the screen 160 of the first exemplary embodiment. The screen 1360 becomes able to reflect incident light from the projector 1200 to a specific area by adjusting the shapes of a plurality of concave portions in the reflection surface 1365. Hence, by providing the reflection surface 1365, the screen 1360 is able to allow incident light from the projector 1200 to travel in a direction to the specific area where the viewers are present. Hence, there can be achieved an advantage that a bright, homogeneous projection image can be observed in a wide range across the area where the viewers are present.

Figure 14:
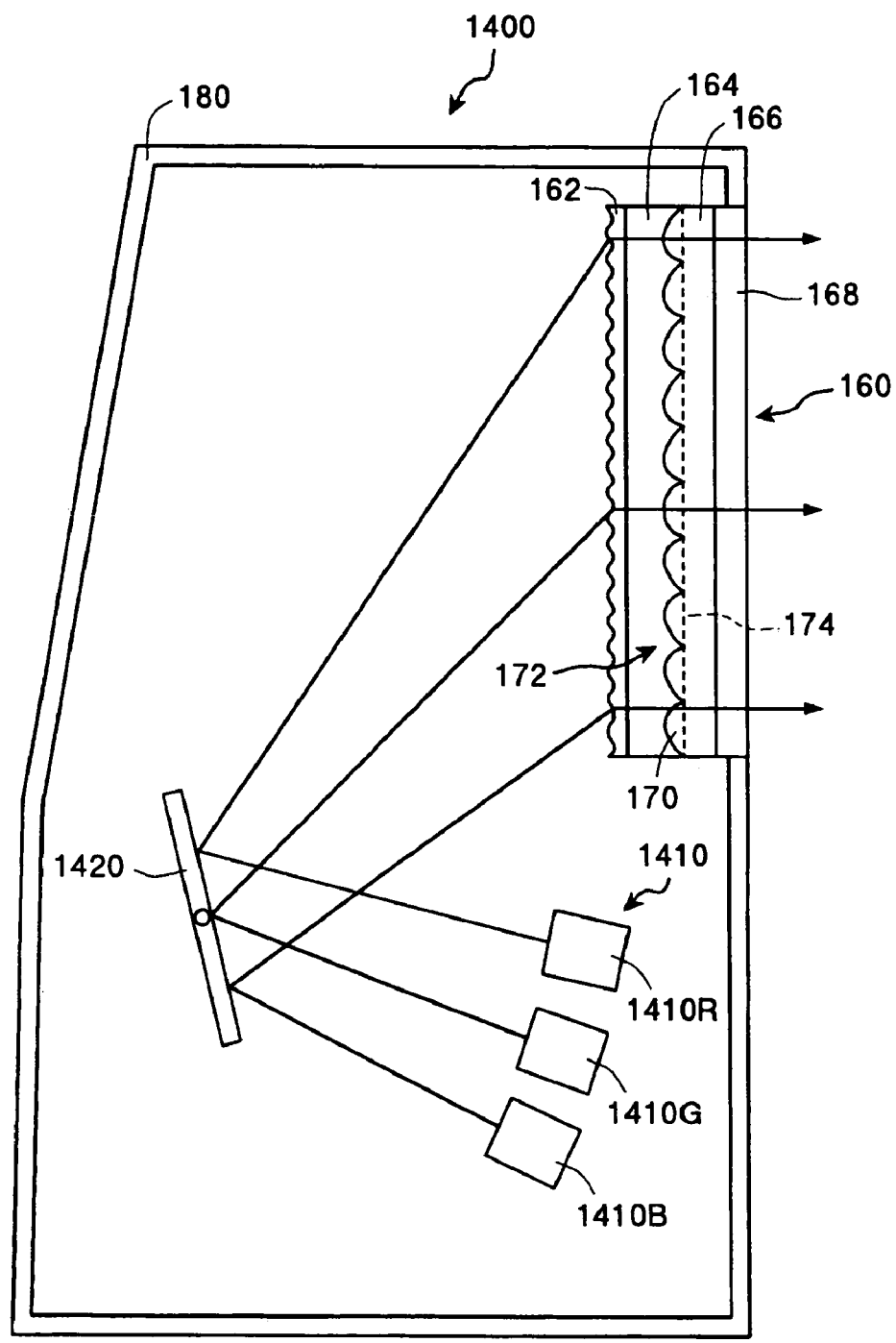
FIG. 14 is a view schematically showing the configuration of a projector according to a fourth exemplary embodiment of the invention.

FIG. 14 is a view schematically showing the configuration of a projector 1400 according to a fourth exemplary embodiment of the invention.

Like components are labeled with like reference numerals with respect to the projector 100 in the first exemplary embodiment above, and the explanation will not be repeated. The projector 1400 is a laser projector that displays an image by scanning laser light. A laser light generating portion 1410 includes a first color laser light source 1410R to emit first color laser light, a second color laser light source 1410G to emit second color laser light, and a third color laser light source 1410B to emit third color laser light. The first color laser light is R light, the second color laser light is G light, and the third color laser light is B light. The laser light sources 1410R, 1410G, and 1410B modulate and then emit the R light, the G light, and the B light, respectively, according to an image signal. The laser light sources 1410R, 1410G, and 1410B can be semiconductor lasers or solid-state lasers provided with modulation portions to modulate the R light, the G light, and the B light, respectively.

Light of respective colors from the laser light generating portion 1410 is projected incident on a galvanometer mirror 1420. The light of respective colors that comes incident on the galvanometer mirror 1420 is reflected in a direction to the screen 160. The galvanometer mirror 1420, by rotating about predetermined two axes that intersect at right angles with each other, scans the light of respective colors in a 2-D direction. The screen 160 displays a projection image with the light of respective colors scanned by the galvanometer mirror 1420. By providing the screen to the projector 1400, as with the projector 100 in the first exemplary embodiment, there can be achieved an advantage that a bright, homogeneous projection image can be observed in a wide range across the area where the viewers are present.

The projectors in the respective embodiments above use an ultra-high pressure mercury lamp or a laser light source as the light source portion. It should be appreciated, however, that the light source portion is not limited to the foregoing. For example, a solid-state light emitting element, such as a light emitting diode element (LED), can be used as well. Further, in a case where solid-state light emitting elements that respectively emit R light, G light, and B light are used as the light source portion, the color separation optical system may be omitted from the projectors in the embodiments above. Also, applications of the invention are not limited to a so-called triple-plate projector provided with three transmissive liquid crystal display devices or a laser projector, and the invention can be also applied to a so-called single-plate projector provided with a single transmissive liquid crystal display device, a projector employing a reflective liquid crystal display device, or a projector employing a tilt mirror device.

As has been described, the screen of the invention can be useful for presentations or when a moving picture is displayed, and particularly suitable when a projection image from the projector is displayed.

What is claimed is:

1. A screen having a micro-lens array provided to an incident side of incident light, comprising:
   a plurality of micro-lens elements each having a first surface having a curvature and a second surface of an almost planar shape through which incident light that is incident on said first surface is transmitted;
   said plurality of micro-lens elements being aligned on a reference plane having a specific region; and
   a substantially central position of a region of said second surface of each micro-lens element being a reference central position, and, when a plane that comes in contact with said first surface of said micro-lens element and said reference plane are almost parallel to each other, a position of a contact point of said plane that comes in contact with said first surface and said first surface, projected on said reference plane, being an apical curvature position, then said first surface has the curvature by which said reference central position and said apical curvature position are varied by a predetermined distance in a predetermined direction, according to said reference central position of said micro-lens element on said reference plane.

2. The screen according to claim 1,
   a distance between said reference central position of said micro-lens element and a predetermined position on said reference plane, and said predetermined distance between said reference central position of said micro-lens element and said apical curvature position of said micro-lens element being almost proportional.

3. The screen according to claim 1,
   an orientation of a predetermined position on said reference plane with respect to said reference central position of said micro-lens element, and an orientation of said apical curvature position of said micro-lens element with respect to said reference central position of said micro-lens element being almost identical.

4. The screen according to claim 1,
   each of said micro-lens elements refracting and then emitting said incident light so as to irradiate a specific area with an almost homogeneous distribution of light intensity.

5. The screen according to claim 1, further comprising:
   a Fresnel lens that converts said incident light to almost parallel beams of light to be emitted toward said micro-lens array,
   said micro-lens elements refracting and then emitting said almost parallel beams of light from said Fresnel lens.

6. The screen according to claim 1,
   said micro-lens elements refracting and then emitting said incident light, which is scattered light or converged light.

7. The screen according to claim 1, further comprising:

a reflection surface that reflects said incident light that has been refracted on said first surface and transmitted through said second surface, said reflection surface reflecting said incident light in a direction to said first surface; and said first surface refracting and then emitting said incident light from said reflection surface.

8. A projector, comprising:

a case provided with a screen on a predetermined surface, inside said case the case housing:

a light source portion that supplies light containing first color light, second color light, and third color light;

a color separation optical system that separates light supplied from said light source portion to said first color light, said second color light, and said third color light;

a first color light spatial light modulation device that modulates said first color light according to an image signal;

a second color light spatial light modulation device that modulates said second color light according to an image signal;

a third color light spatial light modulation device that modulates said third color light according to an image signal;

a color synthesis optical system to that synthesizes said first color light, said second color light, and said third color light modulated in said first color light spatial light modulation device, said second color light spatial light modulation device, and said third color light spatial light modulation device, respectively; and a projection optical system that projects light synthesized in said color synthesis optical system, and said screen being the screen according to claim 1.

9. A projector, comprising:

a laser light generating portion that modulates and then emits laser light of respective colors, including first color laser light, second color laser light, and third color laser light, independently according to an image signal;

a light scanning portion, having a reflection surface that reflects said laser light of respective colors from said laser light generating portion, to scan said laser light of respective colors in a 2-D direction by rotating said reflection surface about predetermined two axes intersecting at right angles with each other; and a screen that displays a projection image by said laser light of respective colors scanned by said light scanning portion, said screen being the screen according to claim 1.

* * * * *